US006842550B2

United States Patent
Takeuchi et al.

(10) Patent No.: US 6,842,550 B2
(45) Date of Patent: Jan. 11, 2005

(54) OPTICAL SWITCH

(75) Inventors: Yukihisa Takeuchi, Nishikamo-Gun (JP); Tsutomu Nanataki, Toyoake (JP); Koji Kimura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 151 days.

(21) Appl. No.: 10/027,775

(22) Filed: Dec. 20, 2001

(65) Prior Publication Data

US 2002/0176656 A1 Nov. 28, 2002

Related U.S. Application Data

(63) Continuation-in-part of application No. 09/799,329, filed on Mar. 5, 2001, now Pat. No. 6,542,658, which is a continuation-in-part of application No. 09/749,068, filed on Dec. 27, 2000, now abandoned.

(30) Foreign Application Priority Data

Dec. 22, 2000 (JP) .................................... 2000-391715
Mar. 1, 2001 (JP) .................................... 2001-056740

(51) Int. Cl.$^7$ .............................................. G02B 6/35
(52) U.S. Cl. ........................... 385/16; 385/17; 385/18; 385/47; 385/48
(58) Field of Search ................................... 385/16–23

(56) References Cited

U.S. PATENT DOCUMENTS

| | | | | |
|---|---|---|---|---|
| 3,514,183 A | * | 5/1970 | Rabedeau | 359/222 |
| 3,520,595 A | * | 7/1970 | Treuthart | 359/222 |
| 3,649,105 A | * | 3/1972 | Treuthart | 359/222 |
| 5,647,033 A | * | 7/1997 | Laughlin | 385/16 |
| 5,841,916 A | * | 11/1998 | Laughlin | 385/16 |
| 5,875,271 A | * | 2/1999 | Laughlin | 385/16 |
| 5,909,301 A | * | 6/1999 | Laughlin | 359/222 |
| 5,917,641 A | * | 6/1999 | Laughlin | 359/222 |
| 6,154,586 A | | 11/2000 | MacDonald et al. | |
| 6,236,778 B1 | * | 5/2001 | Laughlin | 385/24 |
| 6,356,678 B1 | * | 3/2002 | Teitelbaum et al. | 385/18 |
| 6,438,283 B1 | * | 8/2002 | Karaguleff et al. | 385/18 |
| 6,438,284 B1 | * | 8/2002 | Colbourne | 385/18 |
| 6,529,655 B1 | * | 3/2003 | Jurbergs | 385/19 |
| 6,542,658 B2 | * | 4/2003 | Takeuchi et al. | 385/18 |
| 2002/0105709 A1 | * | 8/2002 | Whitehead et al. | 359/222 |
| 2003/0190114 A1 | * | 10/2003 | Takeuchi et al. | 385/18 |

FOREIGN PATENT DOCUMENTS

JP   11-326791 A1   11/1999

\* cited by examiner

*Primary Examiner*—Hemang Sanghavi
*Assistant Examiner*—Scott Alan Knauss
(74) *Attorney, Agent, or Firm*—Burr & Brown

(57) ABSTRACT

An optical switch comprises a light transmission portion, an optical path-changing portion, an actuator portion and light transmission channels; said light transmission portion having a light reflecting plane provided on one part of a plane facing the changing portion to totally reflect light; said optical path-changing portion being provided in proximity to the light reflecting plane and having an optical path-changing member for reflecting or scattering light; said actuator portion having a mechanism being displaced and transmitting displacement to the optical path changing portion; and said light transmission channels having optical wave guiding bodies and being provided in three directions with the light reflecting plane as a starting point. Switching or dividing of an optical path is conducted by contacting or separating the optical path-changing portion to or from the light reflecting plane by displacement of the actuator portion.

46 Claims, 24 Drawing Sheets

OPTICAL SWITCH

This application is a continuation-in-part of U.S. patent application Ser. No. 09/799,329 filed Mar. 5, 2001 now U.S. Pat. No. 6,542,658 which is a continuation-in-part of U.S. patent application Ser. No. 09/749,068 filed Dec. 27, 2000 now abandoned.

TECHNICAL FIELD

The present invention relates to an optical switch. More specifically, the present invention relates to an optical switch suitable for an optical communication system, an optical storage device, an optical arithmetic unit, an optical recorder, an optical printer and so forth, particularly, for the optical communication system in which a multichannel optical switch is desired to perform switching for each specific beam.

BACKGROUND ART

With recent developments in optical communication technology, optical switches have been sought that allow high-speed response, size reduction, high integration, low power consumption, and reduction of signal attenuation.

Conventionally-known optical switches include the ones in which liquid crystal is used, optical fibers are moved by a mechanical device using an electromagnet, a micromirror is used and so forth.

However, the optical switch using liquid crystal performs switching on the basis of molecular orientation, so that the optical switch has been slow in response and has not been easily adapted to optical communication requiring high-speed communication. There also has been a problem in that utilization efficiency of light is low since a polarizing plate has to be employed.

In the optical switch in which optical fibers are moved by a mechanical device using an electromagnet, the device could not be reduced in size and it has been difficult to meet the demands for a high degree of integration. Additionally, there has been a problem in that power consumption is large as switching is performed by the mechanical operations of an electromagnet.

In the optical switch using a micromirror, the manufacturing process becomes complex and the manufacturing costs are thus high, which is troublesome. There also has been a problem in that attenuation of signals is large since the light is required to propagate through the atmosphere.

In addition to these optical switches, an optical switch is proposed that performs switching by utilizing the change in refractive indexes of optical waveguides due to electro-optic effects during the application of electric fields to the optical waveguides.

However, in this type of optical switch, there is a problem in that the switch is likely to be affected by interference from electric fields applied by other switches by which the other optical waveguides are controlled. Particularly, when an optical switch is reduced in size, electrodes to apply electric fields to each optical waveguide inevitably get close to each other, increasing the interfering effect of electric fields between adjacent optical waveguides and generating errors due to crosstalk and so forth, which has been troublesome.

Additionally, an optical switching element has been proposed that has: a light guide portion for performing light transmission by confining light internally by total reflection; an optical switching portion for extracting the light confined internally to the outside of the light guide portion when the optical switching portion is in contact with the light guide portion, and then reflecting the extracted light into the direction of the desired light guide portion; and a driving portion for driving the optical switching portion (JP-A-11-202222).

However, this optical switching element is configured to let the light guide portion extend light transmission of input light only in one direction. At the same time, the switching element unintentionally outputs the light that is input to the light guide portion, to the outside by contacting the switching portion to an unspecific total reflecting plane of the light guide portion. In other words, the switch only turns light on or off. Accordingly, the following configurations cannot be achieved: a switching element as an optical switch that outputs specific input light after switching or dividing the optical path thereof to a plurality of specific output side ends; an optical switch that outputs a plurality of specific input light to specific output ends by switching each optical path of the input light; and a multichannel optical switch that outputs a plurality of specific input light after switching or dividing the input light to a specific plurality of output ends. Although the switching element may be applicable to objects such as an image display, it has been practically difficult to apply the switching element to an optical communication system.

Moreover, in addition to the configuration whereby the light guide portion extends light transmission only in one direction, the optical switching element is configured to utilize infinitely repeated total reflection of the light guide portion. Thus, an emitting direction at the switching portion, in consideration of refraction at an interface between atmosphere and the light guide portion, is restricted to a deeper angle than the total reflection angle thereof; in other words, an almost vertical direction to the total reflecting plane. Even in this sense, switching to transmit light into different directions for each specific light could not be performed.

DISCLOSURE OF THE INVENTION

The present invention has been made in view of the aforementioned problems, and the object of the present invention is to provide an optical switch suitable for an optical communication system, that solves the problems of conventional optical switches, and allows for low power consumption, a high-speed response, size reduction and high integration, significant reduction of signal attenuation and, furthermore, switching per specific input light.

The present inventors, after thorough research to solve the above-noted problems, have discovered that the object mentioned above may be achieved by: providing a light transmission portion having optical transmission channels, consisting of optical wave guiding bodies, in at least three directions with a light reflecting plane at one part on a surface of a light transmission portion, facing an optical path-changing portion, as a starting point. The optical path-changing portion is contacted or separated from the light reflecting plane of the light transmission portion at wavelength levels of input light based on displacement of an actuator portion.

Specifically, according to the present invention, there is provided an optical switch including at least a light transmission portion, an optical path-changing portion and an actuator portion. The light transmission portion has a light reflecting plane provided on at least one part of a plane facing the optical path-changing portion to totally reflect light. Light transmission channels are provided having optical wave guiding bodies in at least three directions with the light reflecting plane functioning as a starting point. The optical path-changing portion is provided in proximity to the light reflecting plane of the light transmission portion in a movable condition and has an optical path-changing member for at least reflecting or scattering light. The actuator portion has a mechanism that is displaced by external signals and transmits the displacement to the optical path-changing portion. The switching or dividing of an optical path is carried out by contacting or separating the optical path-changing portion to or from the light reflecting plane of the light transmission portion by displacement of the actuator portion in response to the external signals. An optical path where the input light from the light transmission channels is totally reflected at the light reflecting plane of the light transmission portion and is transmitted to a specific light transmission channel on an output side when the optical path-changing portion is separated from the light reflecting plane of the light transmission portion. Additionally, an input light from the light transmission channel can be reflected or scattered at the optical path-changing portion, and transmitted to a specific one or more light transmission channels on the output side when the optical path-changing portion is contacted to the light reflecting plane of the light transmission portion.

It is preferable, in the present invention, that the actuator portion has a piezoelectric/electrostrictive element including a piezoelectric/electrostrictive layer and at least one pair of electrodes arranged on one part of the piezoelectric/electrostrictive layer. A vibrating member is provided in contact with at least one part of the piezoelectric/electrostrictive element to support the piezoelectric/electrostrictive element and convert strain of the piezoelectric/electrostrictive layer into bending displacement or vibrations. A fixing member is provided to fix at least one part of the vibrating member so as to vibrate the vibrating member. A displacement transmission member is provided arranged between the optical path-changing portion and the piezoelectric/electrostrictive element and transmits displacement of the piezoelectric/electrostrictive element to the optical path-changing portion.

It is preferable that a ceramic substrate is constituted by unitarily sintering the vibrating member and the fixing member, and that a recessed portion or a hollow portion is formed in the substrate which gives the vibrating member a thin structure. Moreover, the actuator may be a so-called stacked actuator composed of a laminated body in which an anode layer of linking multiple layers as anodes and a cathode layer of linking multiple layers as cathodes are alternately laminated on the piezoelectric/electrostrictive layer composed of ceramics therebetween.

In the present invention, it is more preferable that the light transmission portion includes two or more layers having different light refractive indexes, and that the light transmission channels of the light transmission portion include optical waveguides.

Additionally, the light transmission portion may be configured by joining at least two optical wave guiding bodies to one optical wave guiding body so as to form light transmission channels in at least three directions with the light reflecting plane of the light transmission portion acting as a starting point. Moreover, in the present invention, it is preferable that a condenser lens or a collimator lens is arranged at each of a plurality of light-signal input ends and/or light-signal output ends of the light transmission portion, and that light signals are input and output through the condenser lens or the collimator lens.

In addition, in the present invention, the optical path-changing portion preferably has a light introduction member made of a transparent material. The optical path-changing member may be a light reflector for specularly reflecting or diffusely reflecting light, or a light scattering body for scattering light. In the present invention, the optical path-changing portion may be constituted by a light reflector for diffusely reflecting light or a light scattering body. The light reflector for specularly reflecting or diffusely reflecting light may be a light reflecting film that is integrally formed on a plane of the light introduction member on the side of the displacement transmission member.

Additionally, according to the present invention, a multichannel optical switch having a plurality of the optical switches mentioned above is provided.

As an embodiment in a multichannel optical switch of the present invention, a multichannel optical switch may be included in which each light transmission channel of a plurality of optical switches is formed of a single light transmission portion. The multichannel optical switch is configured to let a part of each light transmission channel share a part of channels by crossing each other.

Other embodiments in multichannel optical switches of the present invention may include the following examples: A switch in which a plurality of optical switches are constituted by linking one input-side channel to one output-side channel between adjacent optical switches, and switching the light input from input ends in an optical switch at each optical path-changing portion of a plurality of optical switches including the optical switch. A switch in which a plurality of optical switches are constituted by at least one optical switch having a plurality of input-side channels and at least one optical switch having a plurality of output-side channels and in which one input-side channel is linked to one output-side channel between adjacent optical switches, and switching the light input from input ends of a plurality of optical switches at the optical path-changing portion of the plurality of optical switches. A switch having a plurality of optical switches in which one input-side channel is linked to one output-side channel between adjacent optical switches by means of optical fiber, and switching at least the light input from input ends in an optical switch at each optical path-changing portion of a plurality of optical switches, or the like.

In the present invention, the multichannel switch, furthermore, may include: The switch in which a plurality of the multichannel switches are arranged in a row; or the switch that has a plurality of the multichannel optical switches, and in which each multichannel optical switch is arranged by locating at least one part of output ends themselves of each light transmission channel in each multichannel optical switch in an arc condition with an input end in an outer light transmission channel, which is disposed separately from each multichannel optical switch, at a center.

Furthermore, the multichannel optical switch may include: The switch in which an optical divider or an optical coupler is joined to a light-signal input end or a light-signal output end of a light signal of each light transmission channel in the multichannel optical switches to branch or collect at least one part of light transmission channels. The switch in which an optical demultiplexer filter or an optical multiplexer is joined to a light-signal input end or a light-signal output end of each light transmission channel in the multichannel optical switches to branch or collect at least one part of light transmission channels. The switch in which each output end or each input end of a plurality of the multichannel optical switches is linked to a plurality of input ends or output ends in at least another similar multichannel optical switch.

Moreover, in the multichannel optical switch of the present invention, it is preferable that each optical path-changing portion has a light reflector and at least two kinds of light reflection angles shared among the optical path-changing portions.

The whole description of the specification of U.S. patent application Ser. No. 09/799,329 filed on Dec. 27, 2000 is incorporated herein by reference.

BRIEF DESCRIPTION OF THE DRAWINGS

FIG. 1(a) shows a state in which an optical path-changing portion is separated from a light transmission portion.

FIG. 10(a) shows an embodiment of a piezoelectric/electrostrictive element using a displacement in the Y direction, which is a direction of lamination.

FIG. 23(a) shows a state in which an optical path-changing portion is separated from a light transmission portion, and FIG. 23(b) shows a state in which the optical path-changing portion is in contact with the light transmission portion.

DETAILED DESCRIPTION THE INVENTION

Figure 1A:
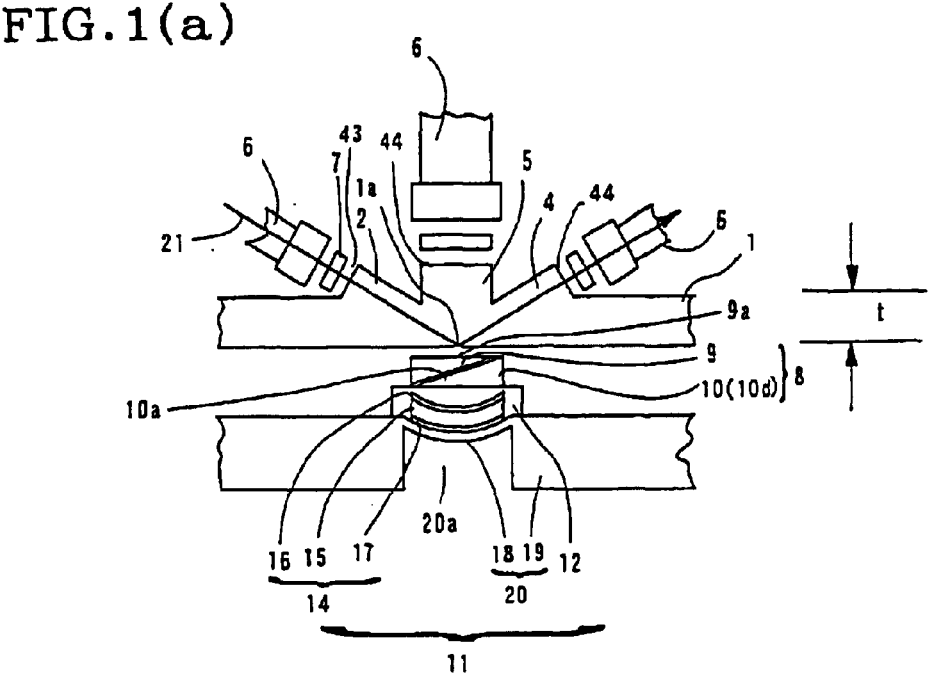
FIGS. 1(a), (b) and (c) are explanatory views, displaying one embodiment of an optical switch of the present invention.
Figure 1B:
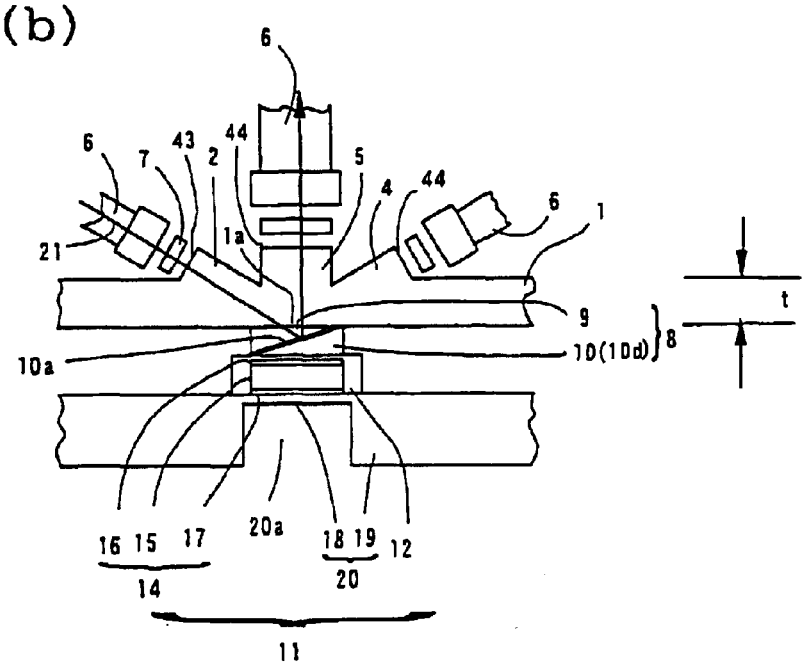
FIG. 1(b) shows a state in which the optical path-changing portion is in contact with the light transmission portion.
Figure 1C:
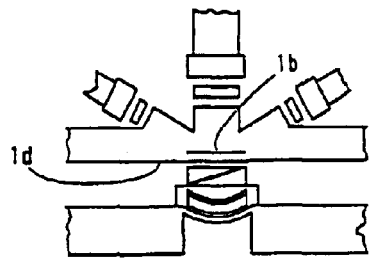
FIG. 1(c) shows a plane facing the optical path-changing portion and a plane corresponding to the optical path-changing portion in the light transmission portion.
Figure 23A:
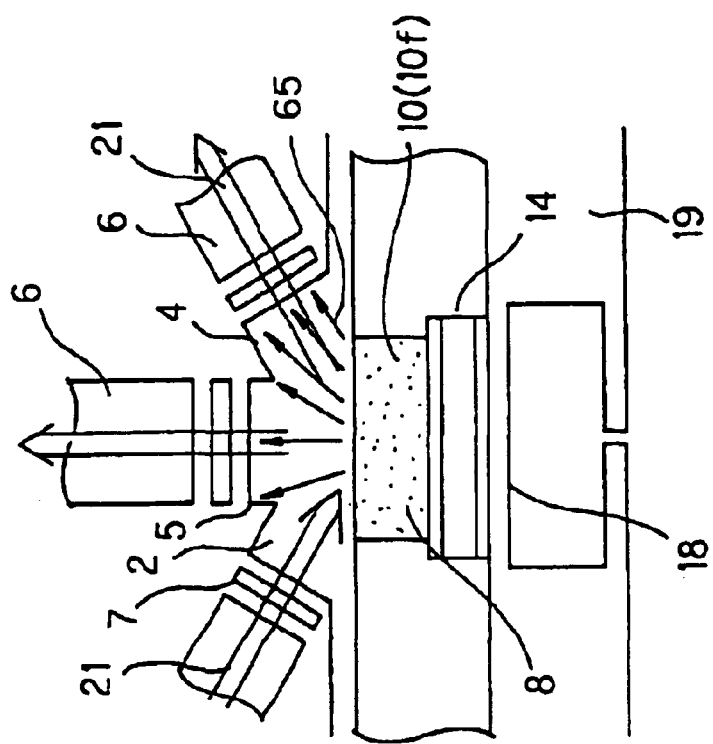
FIGS. 23(a) and 23(b) are explanatory views, displaying another embodiment of an optical switch of the present invention.
Figure 23B:
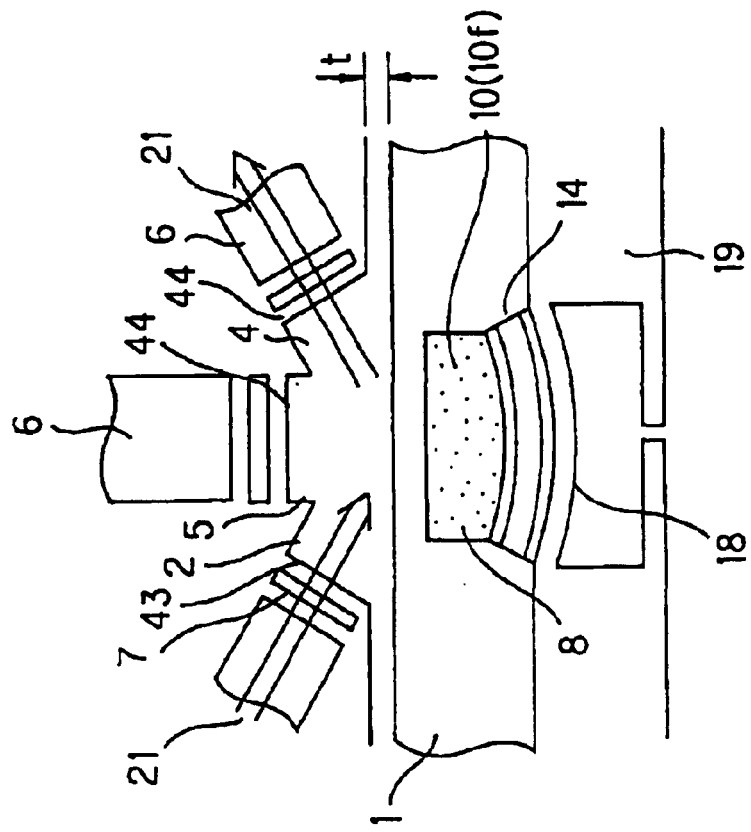

FIGS. 1(a), (b), and (c) are explanatory views schematically showing one embodiment of an optical switch of the present invention: FIG. 1(a) shows a state in which an optical path-changing portion is separated from a light transmission portion, FIG. 1(b) shows a state in which the optical path-changing portion is in contact with the light transmission portion, and FIG. 1(c) shows a plane facing the optical path-changing portion and a plane corresponding to the optical path-changing portion in the light transmission portion. In addition, FIGS. 23(a) and 23(b) are explanatory views schematically showing a state of operation of another embodiment of an optical switch of the present invention.

As shown in FIG. 1(a), under a condition where an actuator portion 11 is activated by external signals such as voltage in the optical switch of one embodiment of the present invention, an optical path-changing portion 8 is separated from a light transmission portion 1 by displacement of the actuator portion 11. Light 21 that is input to light transmission channel 2 of the light transmission portion 1, is totally reflected at a light reflecting plane 1a of the light transmission portion 1 where a refractive index is adjusted to a predetermined value, without transmitting the light. The light is transmitted to one light transmission channel 4 on an output side.

On the other hand, when the actuator portion 11 is reversed to a non-activation state from this condition, the displacement of the actuator 11 is reset as shown in FIG. 1(b). A light introduction member 9 of the optical path-changing portion 8 contacts the light transmission portion 1 at a distance less than a wavelength of light. Thus, the light 21 input to the light transmission channel 2 is taken to the light introduction member 9 from the light transmission portion 1, and is transmitted through the light introduction member 9. The light 21 transmitted through the light introduction member 9 reaches an optical path-changing member 10. The light is reflected at a reflecting plane 10a of the optical path-changing member 10 constituted with a light reflector which specularly reflects light (hereinbelow sometimes referred to as "a specular reflector"), and is transmitted to another output-side light transmission channel 5 in a direction different from the direction of the light reflected at the light reflecting plane 10a of the optical path-changing member 10. On the other hand, as shown in FIGS. 23(a) and 23(b), the optical path-changing member 10 includes a light scattering body 10f which scatters light, or a light reflector which diffusely reflects light (not illustrated, and hereinbelow sometimes referred to as "a diffuse reflector"). The light 21 which reached the optical path-changing member 10 changes its optical path in various directions as a result of the light scattering body 10f or the diffuse reflector and is emitted outside. As a result, the light is transmitted to a plurality of output-side light transmission channels 4, 5 simultaneously.

The optical switch of the present invention shown in FIGS. 1(a), 1(b), and FIGS. 23(a), 23(b) performs optical switching. That is, the specific light 21 introduced into the light transmission channel 2 of the light transmission portion 1 may be transmitted to one or more different light transmission channels 4, 5 by optionally switching or dividing an optical path based on external signals such as voltage to the actuator portion 11.

Thus, in the optical switch of the present invention, traveling directions of input light or output light may be varied. At the same time, each input light 21 may be reflected at the light reflecting plane 1a of the light transmission portion 1 or the light reflecting plane 10a of the optical path-changing portion 8, and may be transmitted to specific output-side transmission channels 4, 5 for each reflected light thereof. Thus, an optical switch may be achieved in which a great number of optical paths may be optionally selected for specific light. In addition, if an optical path-changing portion 8 provided with a light scattering body 10f or a diffuse reflector is prepared according to a use, there is realized an optical switch capable of dividing an optical path of the input light 21 and transmitting the light to a plurality of light transmission channels 4, 5 simultaneously. Additionally, the light transmission channels 4, 5 are switched not by the change in refractive indexes due to physical effects, for instance, electro-optic effects and so forth unique to a material, but by the mechanical operations of contacting or separating the optical path-changing portion 8 from the light transmission portion 1. Thus, not only the size may be reduced but also highly-integrated multichannel switches may be realized without causing problems such as crosstalk. Furthermore, the moving distance of the optical path-changing portion 8 to perform switching is only in a wavelength order of light, so that high-speed switching may be performed. Moreover, since there is no need for moving the light transmission channels 2, 4, 5 themselves, switching can be performed with low power consumption. Also, optical switching may be basically performed in a closed space and there is no need for switching the light that transmits through the atmosphere, so that attenuation of signals relating to switching may be greatly restrained.

Embodiments of the present invention will be explained in detail below for each component based on the drawings.

1. Light Transmission Portion

As shown in FIGS. 1(a), 1(b), 23(a) and 23(b), the light transmission portion 1 in the present invention has the light reflecting plane 1a that is provided at least at one part of a surface 1d facing the optical path-changing portion 8 described below, for reflecting light. The light transmission channels 2, 4, 5, which comprise an optical wave guiding body, transmit light in at least three directions with the light reflecting plane 1a operating as a starting point. Accordingly, as described above, an optical switch is provided in which multiple optical paths may be optionally selected for each specific light or the optical path for the input light 21 is divided and the light is transmitted to a plurality of light transmission channels simultaneously. Attenuation of signals relating to switching may be restrained to a high degree.

As shown in FIGS. 1(a) and 1(c), the light reflecting plane 1a arranged in the light transmission portion 1 of the present invention is required to include a part of the portion 1b corresponding to the optical path-changing portion 8, in a plane of surface 1d facing the optical path-changing portion 8 described below. The light reflecting plane 1a may also include a plane other than a portion 1b corresponding to the optical path-changing portion 8. However, it is preferable that the light reflecting plane 1a includes the portion 1b corresponding to the optical path-changing portion 8 in order to switch input light effectively.

In addition, the light reflecting plane 1a arranged in light transmission portion 1 to be a starting point of each of the light transmission channels 2, 4, 5, is required to be designed so as to include a plane where the light 21 input in the light transmission channel 2 projects into the plane of surface 1d of the light transmission portion 1 which faces the optical path-changing portion 8 in consideration of disposition of each of the light transmission channels 2, 4, and 5. However, in the present invention, it is not required to make all of the plane 1d of the light transmission portion 1 which faces the optical path-changing portion 8, the light reflecting plane 1a so long as the light reflecting plane 1a includes a plane where the input light 21 projects.

Figure 2:
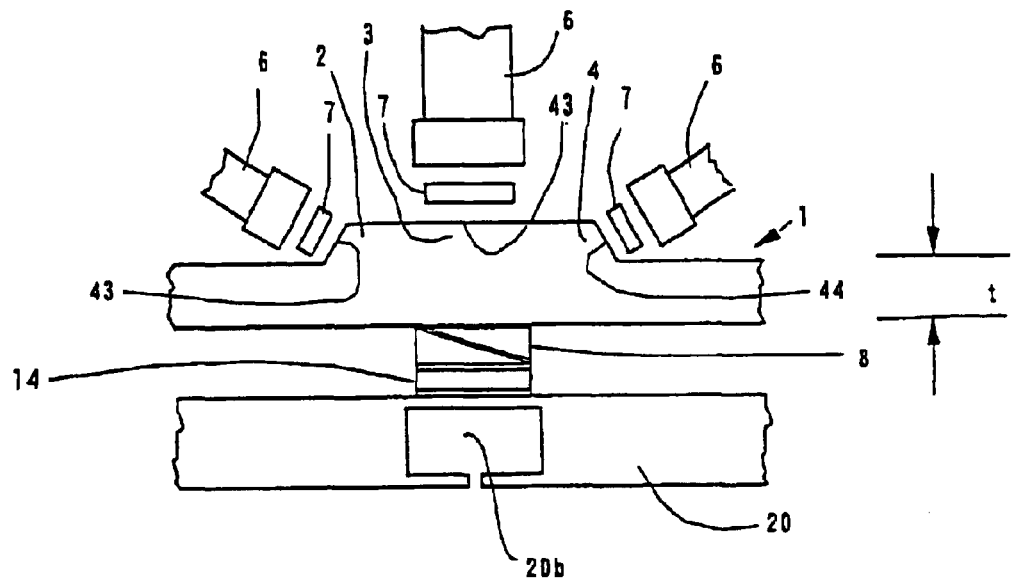
FIG. 2 is an explanatory view schematically showing another embodiment of an optical switch of the present invention.

The light transmission channels 2, 4, and 5 provided in the light transmission portion 1 of the present invention may include a plurality of light signal input ends and/or light signal output ends, as shown in FIGS. 1(a), (b). FIG. 2 consists of a single optical wave guiding body and is substantially formed with the light transmission channels 2, 4, 5 oriented toward at least three directions, with the light reflecting plane 1a of the light transmission portion 1 being a starting point by providing, at a part of the optical wave guiding body, a plurality of light-signal input ends 43 and/or light-signal output ends 44 having a face roughly orthogonal to the input and output direction of light.

Figure 3:
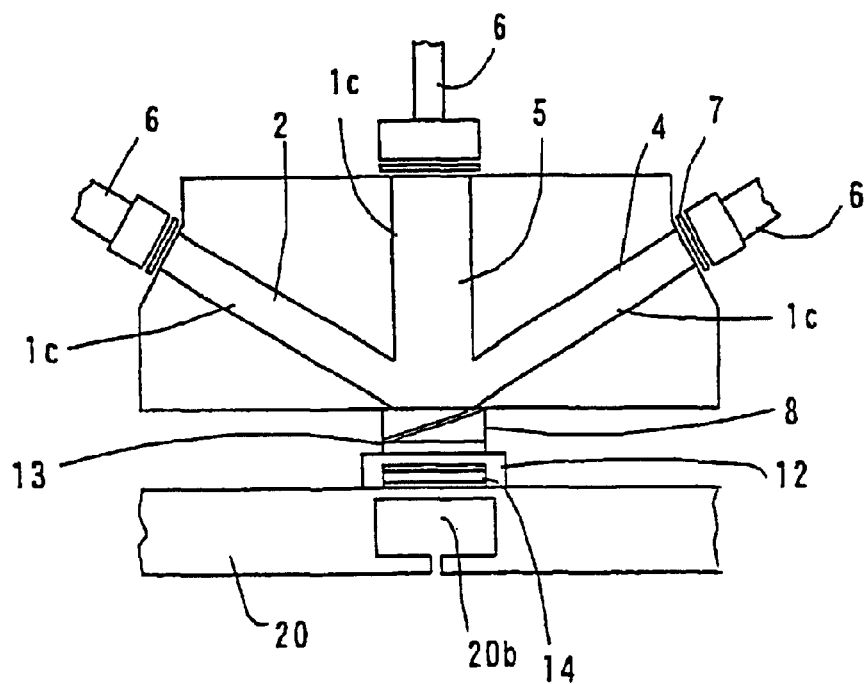
FIG. 3 is an explanatory view schematically showing another embodiment of an optical switch of the present invention.

However, as shown in FIG. 3, in the light transmission portion 1 of the present invention, the light transmission channels 2, 4, 5 are preferably formed by an optical waveguide 1c. If the light transmission channels 2, 4, 5 are formed by an optical waveguide 1c, light can be transmitted in a narrower space and the attenuation of signals that is troublesome in the case of long-distance communications can be reduced to a high degree.

The optical switch of the present invention may be configured to directly input and output light between optical fibers 6 or the like and the light transmission portion 1 by joining the optical fibers 6 or the like to a plurality of light-signal input ends 43 and/or light-signal output ends 44 of the light transmission portion 1 with an adhesive (not illustrated) or the like. Or, the optical switch may be configured to input and output light between optical fibers 6 or the like and the light transmission portion 1 through prisms (not illustrated), by arranging the prisms at a plurality of the light-signal input ends 43 and/or the light-signal output ends 44 of the light trans-mission portion 1. However, it is preferable to configure the optical switch to input and output light between optical fibers 6 or the like and the light transmission portion 1 through lenses 7, by arranging the lenses 7 such as a condenser lens and a collimator lens, at a plurality of the light-signal input ends 43 and/or the light-signal output ends 44 of the light transmission portion 1 as shown in FIGS. 1(a), (b), (c) and FIG. 2, thus reducing input and output loss due to light divergence. Particularly, in the optical switch in which the light transmission channels 2, 4, 5(3) composed of an optical wave guiding body are not restricted to a specific direction as shown in FIGS. 1(a), (b), (c) and FIG. 2, loss due to light divergence at the light transmission portion 1 is reduced. Thus, it is preferable to focus light by a condenser lens 7 and input and output the light between the lens and the light transmission portion 1.

Moreover, in the optical switch shown in FIGS. 1(a), (b), and FIG. 2, since loss due to light divergence at the light transmission channels 2, 4, 5(3) can be reduced by shortening an optical path length and since loss of light can be reduced by increasing the probability that the scattered light 65 released in various directions is transmitted to the light transmission channels 2, 4 and 5 in an optical switch shown in FIG. 23, it is preferable to reduce the thickness indicated as t in the figures. Specifically, the thickness is preferably 1 mm or less, or more preferably 0.5 mm or less.

Furthermore, in an optical switch dealing with specular reflection light as shown in FIGS. 1(a), 1(b), the directions of the light transmission channels 2, 4, 5 are properly determined by relations with refractive indexes between the light wave guiding body, constituting the light transmission channels 2, 4, 5, and the open air (generally air), and by relations with reflection angles at the light reflection member 10 of the optical path-changing portion 8 described later.

Similarly, in an optical switch dealing with scattering light 65 or diffusion light (not illustrated) as shown in FIG. 23, the directions of the light transmission channels 2, 4, 5 are properly determined in consideration of a relation of a refractive index between an optical wave guiding body constituting the light transmission channels 2, 4, 5 and the open air (generally air).

Figure 4:
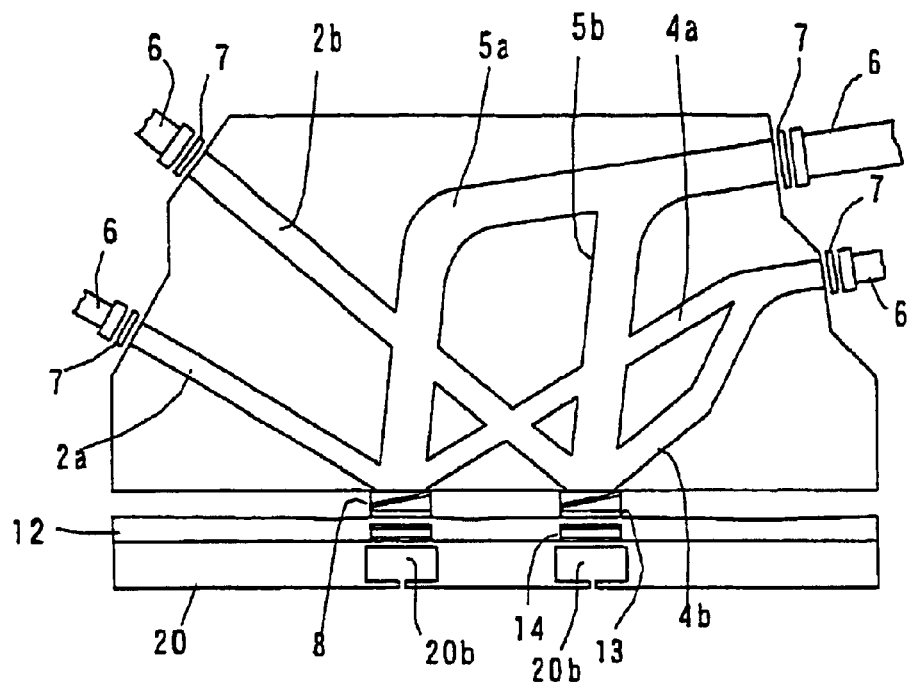
FIG. 4 is an explanatory view schematically showing another embodiment of an optical switch of the present invention.

However, in an optical switch dealing with specular reflection light as shown in FIGS. 1(a), 1(b), the light transmission channels 2, 4, 5 may extend into directions that are appropriate only in these relations. For example, as shown in FIG. 4, in the optical switch having the light transmission channels 2a, 2b, 4a, 4b, 5a, 5b composed of an optical waveguide, the light transmission channels can be extended without being paralleled as an input-side light transmission channel 2a and another input-side light transmission channel 2b. The directions where the transmission channels extend may be changed halfway within a range where light totally reflects in the optical waveguide to form each of the light transmission channels 2a, 2b, 4a, 4b, 5a, 5b by combining straight optical waveguides and non-straight optical waveguides.

In such an optical switch, the degree of freedom in the shapes of the light transmission channels 2a, 2b, 4a, 4b, 5a, 5b is high, and smaller optical switches may be realized.

The optical wave guiding body, constituting the light transmission channels 2, 4, 5, in the present invention has refractive indexes to confine introduced light internally and then transmit the light. The body may be composed of a material having a single refractive index. However, the body is preferably composed of two or more layers having different refractive indexes since light divergence toward laminated layers may be restrained.

Moreover, as shown in FIG. 3, it is particularly preferable that each light transmission channel 2, 4, 5 is formed of an optical waveguide. This is because the light transmission channels 2, 4, 5 may be easily prepared in complex shapes, and the optical waveguide may be easily joined to each other. In addition to the characteristics of the layered optical wave guiding body, light divergence inside the layers is also restrained, so that light may be transmitted with an extremely small loss.

In the present specification, "optical waveguides" indicate the ones that are composed of a transparent material having a distribution of different refractive indexes and perform light transmission by confining light internally.

The optical wave guiding body is, for instance, one made of: glass, quartz, transparent plastic, transparent ceramics, or the like; a laminated body made of multiple layers having different refractive indexes; and substrates provided with a coating layer of a transparent material on a surface, or the like.

Particularly, as the optical waveguide, there is exemplified the one having a substrate consisting of glass such as quartz glass and alkali borosilicate glass, insulator crystal such as lithium niobate and yttrium iron garnet, compound semiconductor such as gallium arsenide and indium phosphide, plastic (polymer) such as polymethylmethaacrylate (PMMA) and polyimide, or the like. The substrate is formed with a film thereon including a material having a refractive index changed by doping an impurity and so forth to the common system of the material used as the substrate. Also the substrate can include a layer or portion having a different refractive index formed by directly diffusing an impurity and so forth into the aforementioned substrate.

The methods of forming a film on a substrate include, for instance, sputtering method, vacuum deposition methods such as molecular beam epitaxy (MBE), chemical vapor deposition (CVD), liquid phase epitaxy (LPE), vapor phase epitaxy (VPE), thermal polymerization used to form a plastic layer, and so forth. As a method for diffusing impurities or the like, there may be employed impurity ion implantation, impurity ion diffusion, or the like. Moreover, in forming multiple layers, these methods may be repeated. The number of layers may be appropriately selected based on desired objectives. Additionally, in the case of an optical waveguide, the film or layer formed by the above-noted means has to be patterned to provide predetermined light transmission channels 2, 4, 5. The patterning may be performed by, for instance, removing unnecessary portions in photolithography or the like, or by preliminarily setting a masking material on the above-noted substrate and then forming a film or diffusing an impurity to provide predetermined light transmission channels 2, 4, 5.

2. Optical Path-changing Portion

As shown in FIGS. 1(*a*), (*b*), and (*c*), the optical path-changing portion 8 of the present invention is provided in proximity to the light reflecting plane 1*a* of the light transmission portion 1 in a movable condition, and it possesses at least a light reflection member 10 for reflecting or scattering light.

In this way the light 21 in the light transmission channel 2 may be optionally reflected (specularly reflected or diffusely reflected) or scattered by the optical path-changing member 10 to switch the light 21 to an optical path different from the optical path which the light 21 is reflected by the light reflecting plane 1*a* of the light transmission portion 1 or to divide the light 21 to a plurality of light transmission channels 4, 5 when the optical path-changing portion 8 is brought into contact with the light transmission portion 1.

Moreover, since light may be switched by mechanical operations such as contact or off-contact from the light transmission portion 1 by displacement of the actuator portion 11 as mentioned later, a compact and highly-integrated multichannel optical switch may be manufactured without any problems such as crosstalk. In particular, it is very advantageous in an optical switch where an optical path is switched as shown in FIG. 1. Furthermore, since the moving distance of the optical path-changing portion 8 for switching is only in the order of light wavelength, high-speed switching may be performed and an optical path itself does not have to be moved, thus reducing power consumption.

Herein, the meaning of being in "proximity to" the light transmission portion 1 is defined to mean the optical path-changing portion 8 is arranged from the light reflecting plane 1*a* of the light transmission portion 1 at a distance longer than a wavelength of input light 21 when the actuator portion 11 is in a non-operable or operable state; and the optical path-changing portion is arranged from the light transmission portion 1 at a distance shorter than a wavelength of input light 21 when the actuator portion 11 is in the reverse condition thereto.

Figure 5:
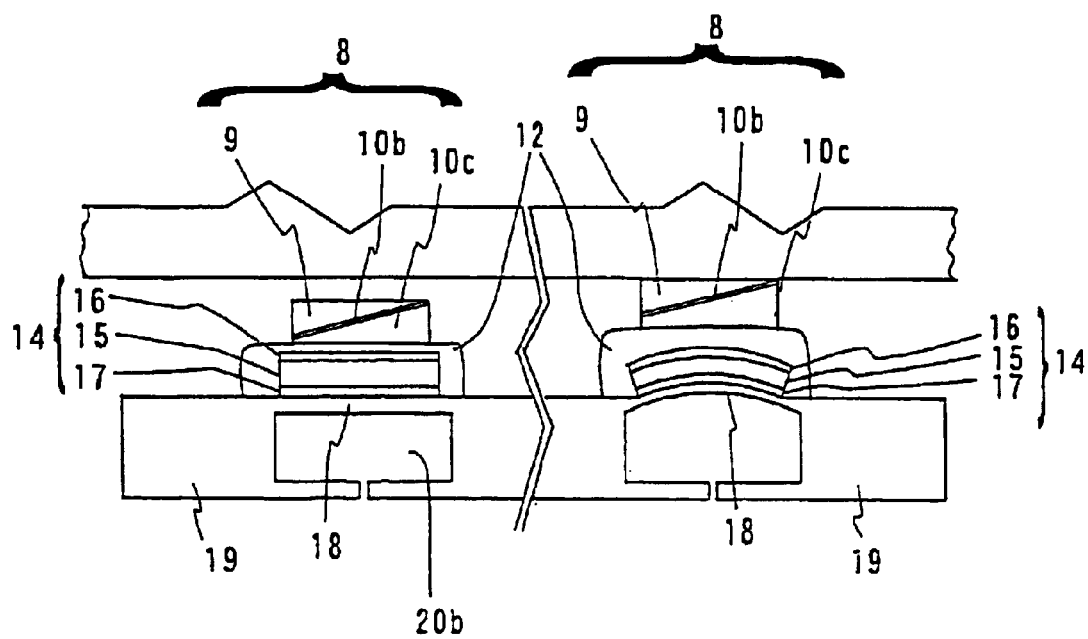
FIG. 5 is an explanatory view schematically showing another embodiment of an optical switch of the present invention.

For instance, as shown in FIG. 1(*a*), when the actuator portion 11 is at an operable state, the optical path-changing portion 8 may be arranged from the light reflecting plane 1*a* of the light transmission portion 1 at a distance longer than a wavelength of input light 21. As shown in FIG. 1(*b*), when the actuator 11 is in a non-operable state, the optical path-changing portion 8 may be arranged from the light reflecting plane 1*a* of the light transmission portion 1 at a distance same as a wavelength of input light 21 or shorter. On the contrary, as shown in FIG. 5, the optical path-changing portion 8 may be arranged from the light transmission portion 1 at a distance that is the same as a wavelength of input light 21 or shorter when the actuator portion 11 is in an operable state. When the actuator portion 11 is in a non-operable state, the optical path-changing portion 8 may be arranged from the light transmission portion 1 at a distance longer than a wavelength of input light 21. These differences are based on the structure of a piezoelectric/electrostrictive element, and the driving methods thereof.

An optical path-changing portion 8 in the present invention may be provided with a specular reflector 10*d* shown in FIGS. 1(*a*), 1(*b*), or a light scattering body 10*f* shown in FIGS. 23(*a*), 23(*b*), or a diffuse reflector (not illustrated). More specifically, the optical switch may include an optical path-changing portion 8 provided with the specular reflector 10*d* as shown in FIGS. 1(*a*), 1(*b*) in the case where the purpose is to switch a specific optical path to another specific optical path. The optical switch may include an optical path-changing portion 8 provided with the light scattering body 10*f* as shown in FIGS. 23(*a*), 23(*b*) or the diffuse reflector (not illustrated) in the case where the purpose is to divide an optical path to a plurality of other optical paths.

In the present invention, in an optical switch where the optical path-changing portion 8 is provided with the specular reflector 10*d*, it is preferable that the specular reflector 10*d* exhibits total reflection.

Figure 9:
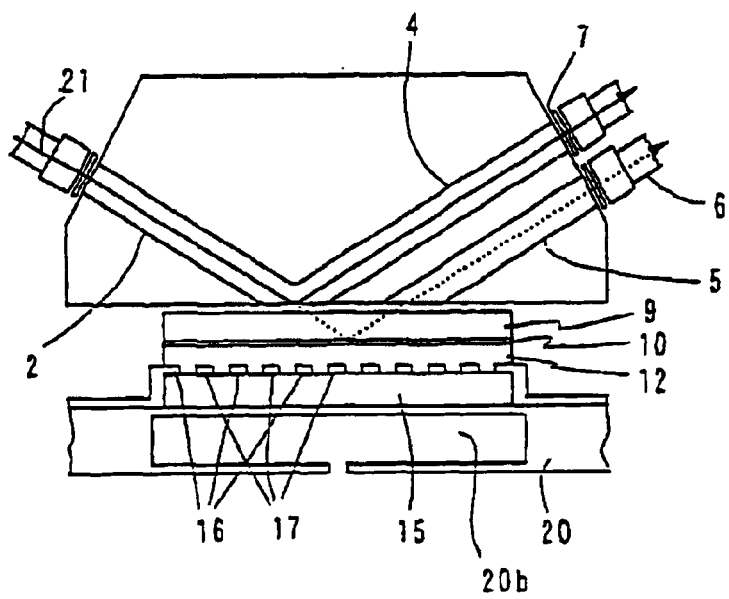
FIG. 9 is an explanatory view schematically showing another embodiment of an optical switch of the present invention.

Reflection angles at the specular reflector 10*d* may be appropriately determined based on the configuration of switches in accordance with the desired application. In addition to the reflection member to reflect light provided having an inclined surface with predetermined angle as shown in FIGS. 1(*a*), (*b*), and (*c*), the reflection member may include, for example, a plate optical path-changing member 10 arranged in a flat condition at an angle of 0° as shown in FIG. 9. The optical path shown by a broken line in FIG. 9 shows an optical path when the optical path-changing portion 8 is brought into contact with the light transmission portion 1.

Also, reflection angles of the specular reflector 10*d* may be the angles, as shown in FIGS. 1(*a*), (*b*), and (*c*), to switch an optical path of light 21 that is input to one light transmission channel 2 and is transmitted to the light transmission channel 4 on an output side, to an optical path of light that is reflected at the specular reflector 10*d* of the optical path-changing portion 8 and is transmitted to the light transmission channel 5 on another output side. The reflection angles of the light reflection member 10 may be the reflection angles, as shown in FIG. 2, to switch an optical path of light (not illustrated) that is input to the light transmission channel 2 on an input side and is transmitted to the light transmission channel 4 on an output side, to an optical path of light 21 that is input to the light transmission channel 3 on another input side and is transmitted to the light transmission channel 4 on the same output side. In the case that the specular reflection is total reflection, this reflection angle satisfies conditions of total reflection.

The specular reflector 10*d* in the present invention includes, for instance, a plate specular reflector made of a light reflecting material that is arranged with a predetermined inclination, or a specular reflector such as a trigonal prism and a rectangular parallelepiped made of a light reflecting material that is arranged with a predetermined inclination, and so forth.

Figure 6:
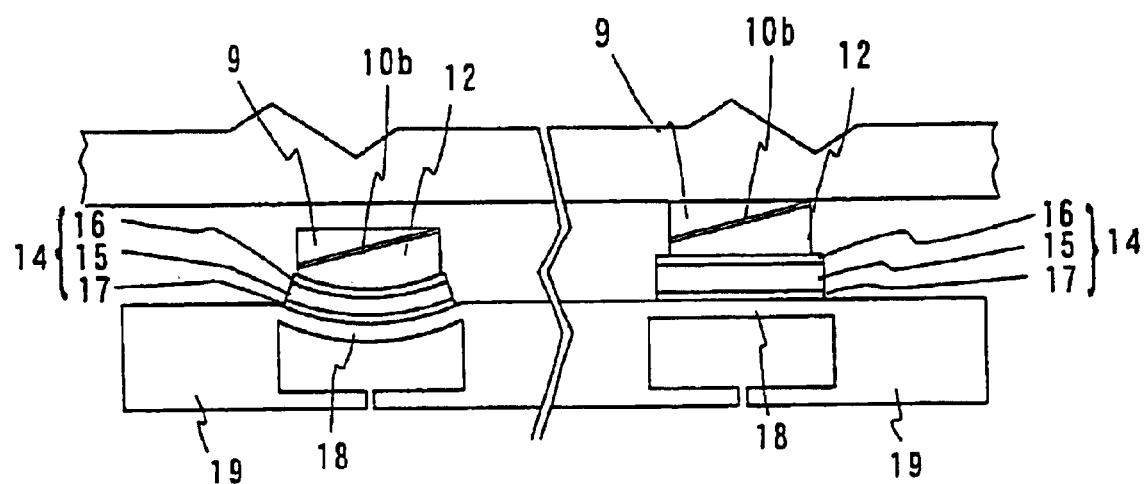
FIG. 6 is an explanatory view schematically showing another embodiment of an optical switch of the present invention.
Figure 7:
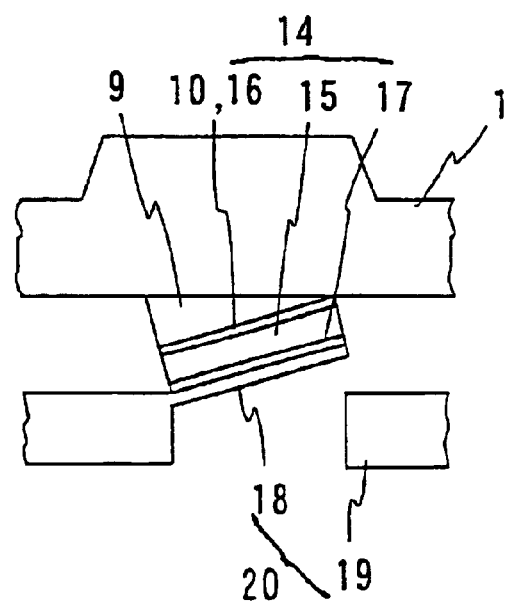
FIG. 7 is a partially enlarged view schematically showing another embodiment of an optical switch of the present invention.

The specular reflector may also include an electrode 16 having a light reflecting surface as described later and having functions as the specular reflector 10*d* as shown in FIG. 7. Furthermore, as shown in FIG. 5, the specular reflector 10*d* may have a substrate 10*c* of a trigonal prism, rectangular parallelepiped and so forth formed with a light reflecting film 10*b*. The specular reflector 10*d* as shown in FIG. 6 may be the one having the light reflecting film 10*b* itself that is formed integrally on the light introduction member 9 of a trigonal prism, a rectangular parallelepiped or the like at the side of a displacement transmission member 12, and so forth.

Among them, since reflection angles of a light reflection member may be accurately set, the light reflection member 10 having the substrate 10*c* of a, trigonal prism, rectangular parallelepiped or the like formed with the light reflecting film 10*b*, as shown in FIG. 5, or a reflector such as a trigonal prism and a rectangular parallelepiped made of a light reflecting material that is arranged with a predetermined inclination is preferable.

Also, it is preferable that the light reflecting film 10b is formed integrally on the light introduction member 9 of a trigonal prism, a rectangular parallelepiped or the like at the side of the displacement transmission member 12 as shown in FIG. 6 and the displacement transmission member 12 may be made of an elastic material in the point that the number of components can be reduced, manufacturing costs may be low, and contact precision between the optical path-changing portion 8 and the light transmission portion 1 may improve.

The light reflecting film 10b is formed on the light introduction member 9 on the side of the displacement transmission member 12 in the optical switch shown in FIG. 6. This is because precision of reflection angles could not be maintained due to the characteristics of the displacement transmission member 12 if the film is formed on the displacement transmission member 12. Accordingly, it is preferable that the light introduction member 9 has a hardness so as not to change the angle of a light reflection member by the operation of the actuator portion 11 in such an optical switch.

Materials having high reflective efficiency of light are preferable for the specular reflector in the present invention. The materials include, for instance, single metal, alloy, glass, ceramics, rubber, organic resin and so forth by itself or the combination of two or more kinds thereof. The single metal and the components of the alloy include aluminum, titanium, chromium, iron, cobalt, nickel, silver, copper, tin, tantalum, tungsten, iridium, platinum, lead, and so forth.

When two or more kinds of these materials are used in combination, the light reflection member 10 may contain two or more kinds of the materials uniformly, but may also be a layered member, each of the layers consisting of a material different from the others. Additionally, the optical path-changing member 10, as a whole, may consist of the materials. As shown in FIG. 6, the member may be one formed with the light reflecting film 10b on the surface.

As method of forming the light reflecting film 10b, there may be employed, for instance, thin film forming methods such as a vacuum deposition method, a sputtering method, a plating method, an ion plating method, an ion beam method, or a CVD method.

On the other hand, in an optical switch where an optical path-changing portion 8 as shown in FIG. 23 is provided with a light scattering body 10f or a diffuse reflector (not illustrated), an angle of the surface is not preferred, and the light scattering body 10f or a diffuse reflector may be disposed in a position where a loss of scattering light 65 or diffuse reflection light is small from a positional relation with each of the light transmission channels 2, 3 and 4.

In addition, a diffuse reflector in the present invention may have the same structure basically as the aforementioned specular reflector and have a roughened reflecting surface. The roughening may be within a suitable range in consideration of a wavelength of light to be transmitted, and a general method of roughening may be employed.

A light scattering body 10d in the present invention may be prepared by dispersing, for example, a ceramic powder of zirconia, titania or the like, a metal oxide powder of lead oxide or the like, a mixture powder thereof, or the like, in, for example, an epoxy, acrylic, or silicone transparent resin in view of emission efficiency and maintaining flatness.

At this time, the light scattering body 10d preferably includes 10–100 mass parts of a ceramic powder, a metal oxide powder, or a mixture thereof relative to 100 mass parts of the transparent resin.

In addition, in the case that the whole optical path-changing portion is constituted with the light scattering body 10f, it is preferable that 10–100 mass parts of a glass powder having an average particle size of 0.5–10 µm is further mixed with the composition relative to 100 mass parts of a ceramic powder. In a light scattering body 10d having such a composition, contact ability and separating ability with a light transmission portion are improved.

Next, a light introduction member 9 is hereinbelow described.

In the present invention, a light introduction member 9 is not always necessary, and in, for example, an optical switch where an optical path-changing portion 8 as shown in FIGS. 23(a) and 23(b) is provided with a light scattering body 10f or a diffuse reflector (not illustrated), the optical path-changing portion 8 may be constituted only by the light scattering body 10f or the diffuse reflector and have a structure whereby the light scattering body 10f or the diffuse reflector is brought into direct contact with the light transmission portion.

However, in an optical switch where the optical path-changing portion 8 as shown in FIGS. 1(a) and 1(b) is provided with a specular reflector 10d, it is preferable that a light introduction member 9 of a transparent material is disposed on the specular reflector 10d in the point that a contact ability between the optical path-changing portion 8 and the light transmission portion 1 can be optimized by specializing a light introduction function and an optical path-changing function.

Figure 24:
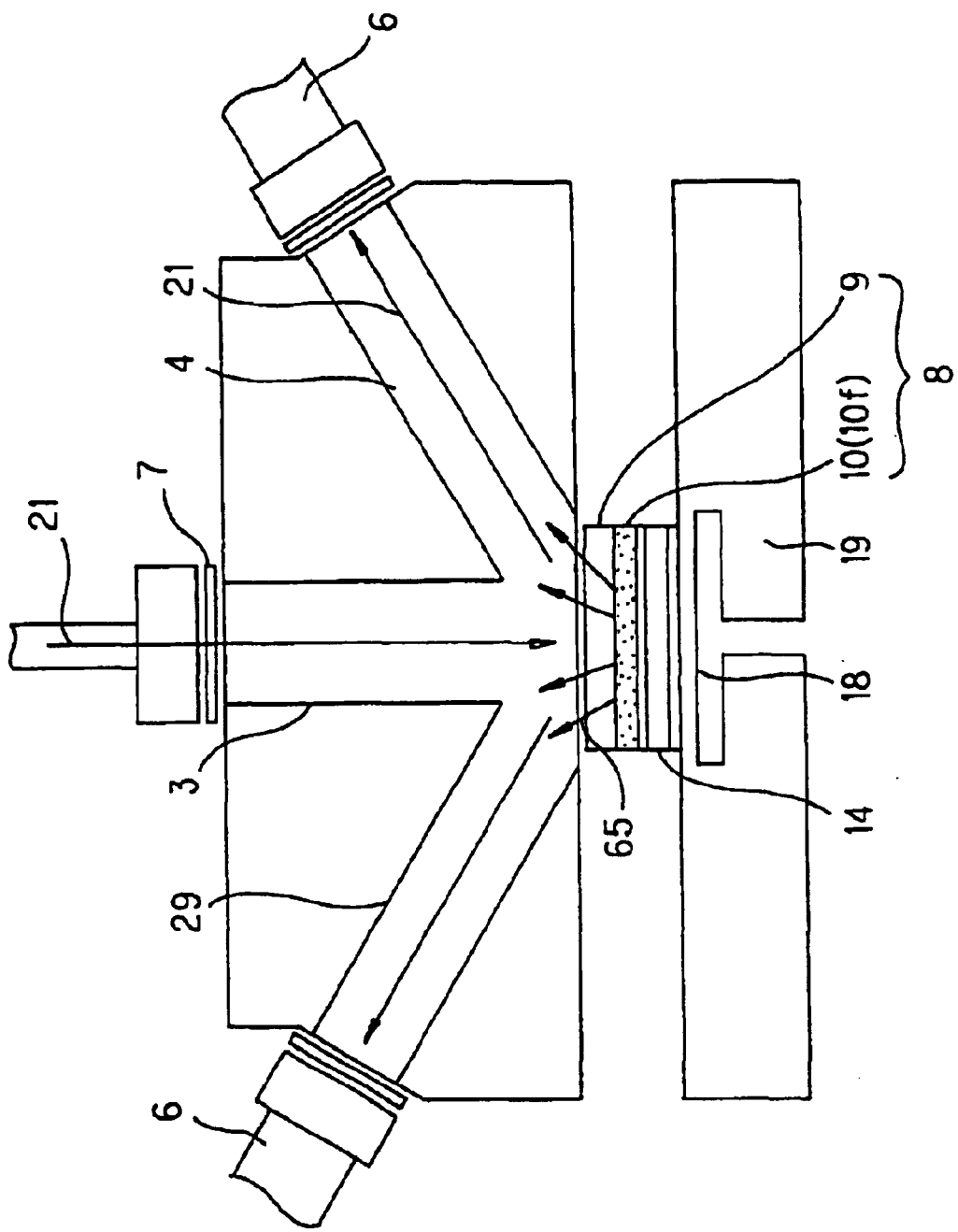
FIG. 24 is an explanatory view schematically showing another embodiment of an optical switch of the present invention.

In addition, even in an optical switch where an optical path-changing portion 8 is provided with a light scattering body 10f or a diffuse reflector (not illustrated), it is preferable to have a light introduction member 9 of a transparent material on the light scattering body 10f or the diffuse reflector as shown in FIG. 24 in the similar point as in the optical switch provided with a specular reflector.

As shown in FIG. 24, in an optical switch where an optical path-changing portion 8 is provided with a light scattering body 10f or a diffuse reflector (not illustrated), in the case where light is input almost perpendicularly to a reflecting plane 1a of the light transmission portion 1 from the light transmission channel 3, the input light 21 is divided to be transmitted to the light transmission path 29 and 4 which are divided right and left with the light transmission channel 3 being located therebetween.

A material of the light introduction member 9 is preferably a transparent material which has a smaller difference in refractive indexes with the light transmission portion 1 than the difference in refractive indexes between the light transmission portion 1 and the open air (generally air). This makes it possible to take out the light from the light transmission portion 1 and return the light to the light transmission channels 4, 5 of the light transmission portion 1 when the optical path-changing portion 8 is in contact with the light transmission portion 1. A transparent material having roughly the same light refractive index as the light transmission portion 1 is more preferable. A material to give such quality may include, for instance, glass, quartz, transparent plastic, transparent resin, transparent ceramics, and so forth.

However, in the present invention, the light introduction member 9 may also be entirely or partially composed of transparent liquid by providing the transparent liquid between the optical path-changing member 10 or the light introduction member 9 and the light transmission portion 1. In this case, the transparent liquid effectively fills up a gap between the optical path-changing member 10 or the light introduction member 9 and the light transmission portion 1, so that optical paths may be easily altered.

As a transparent liquid, there may be employed, for instance, organic solvents of low vapor pressure, oil, and so forth. A transparent liquid may be selected in consideration of a difference in refractive index between the liquid and the light transmission portion 1 and between the liquid and the light introduction member 9.

As a method of holding fluid transparent liquid on the optical path-changing portion, for example, a conventional art in which a wall in an appropriate height is provided at an upper outer periphery of the optical path-changing portion 8, and so forth may be adapted. However, a method is preferable in which the light introduction member 9 is formed with recessed and protruded parts or porous parts, and transparent solution is held in a capillary phenomenon by impregnating transparent solution thereto. In addition, when volatile transparent liquid is used, it is preferable to adapt a configuration in which the optical path-changing portion 8 is sealed airtight with the light transmission portion 1 to avoid vaporization.

On the other hand, in the light introduction member 9 of the present invention, the area where the light introduction member 9 is in contact with the light reflecting plane 1a of the light transmission portion 1 determines the amount of light taken out to the optical path-changing member 10. Thus, a surface 9a of the light introduction member facing the light transmission portion 1 is preferably made wider so as to include a whole plane where the light 21 input in the light transmission channel 2 projects.

It is preferable that the surface 9a facing the light reflecting plane 1a of the light transmission portion 1 is flat so as to secure the surface for a contact area with the light transmission portion 1. Specifically, the flatness is preferably 1 $\mu$m or less, more preferably 0.5 $\mu$m or less, and further preferably 0.1 $\mu$m or less. The flatness of the surface 9a facing the light reflecting plane 1a of the light transmission portion 1 is important in order to reduce a gap under the condition where the light introduction member 9 is in contact with the light reflecting plane 1a of the light transmission portion 1. The flatness is not necessarily limited to the one mentioned above as long as the contact part deforms in the contacting state. However, it is preferable that the flatness is small enough in comparison with a displacement of the actuator portion 11.

On the other hand, the flatness of the surface 9a of the light introduction member 9 is preferably 0.005 $\mu$m or more, and more preferably 0.015 $\mu$m or more so that separation may be securely performed when the light introduction member 9 in contact with the light reflecting plane 1a of the light transmission portion 1 is separated.

"Flatness" described here includes both surface roughness and undulation.

Moreover, the thickness of the light introduction member 9 is preferably less than 50 $\mu$m, more preferably less than 20 $\mu$m, so as to reduce the loss of light.

3. Actuator Portion

The actuator portion 11 in the present invention has functions of displacing with external signals and of transmitting the displacement to the above-noted optical path-changing portion 8, thus allowing the switching by mechanical operations, such as contacting or separating (off-contacting) the optical path changing portion from the light transmission portion.

The actuator portion 11 may be, for instance, one that generates displacement by an elastic body such as a plate spring. However, in view of excellent controllability and high-speed responsiveness, the actuator portion is preferably one that has a displacement transmission portion 12, a piezoelectric/electrostrictive element 14, a vibrating member 18 and a fixing member 19. This type of the actuator portion 11 will be explained in detail below for each component.

(1) Displacement Transmission Member

The displacement transmission member 12 in the present invention is arranged between the optical path-changing portion 8 and the piezoelectric/electrostrictive element 14. The member is arranged in order to transmit displacement of the piezoelectric/electrostrictive element 14 to the optical path-changing portion 8 and to set a contact area between the optical path-changing portion 8 and the light transmission portion 1 at a predetermined size. In particular, a type of piezoelectric/electrostrictive element 14 generating bending displacement shown in FIGS. 1, FIG. 5, or the like, is extremely effective in averaging the amount of displacement distributed within the piezoelectric/electrostrictive element 14 and contacting or separating a whole surface of the optical path-changing portion 8 evenly from the light transmission portion 1.

The displacement transmission member 12 preferably has a configuration where the member may be in contact with both optical path-changing portion 8 and the piezoelectric/electrostrictive element 14 in a large area to allow effective transmission of displacement of the piezoelectric/electrostrictive element 14 to the optical path-changing portion 8.

A material of the displacement transmission member 12 preferably has a hardness to allow direct transmission of displacement of the piezoelectric/electrostrictive element 14 to the optical path-changing portion 8. As materials having such quality, there may be employed, for instance, rubber, organic resin, organic adhesive film, glass, and so forth. Among these, organic resin made of an epoxy-based, acrylic-based, silicone-based, polyolefine-based or the like organic material, or organic adhesive films are preferable. Organic resin or organic adhesive films in which curing and shrinkage are restrained by mixing a filler into these organic materials, are more preferable.

The displacement transmission member 12 is arranged by laminating the displacement transmission member 12 onto the piezoelectric/electrostrictive element 14. The method for lamination may be, for instance, a method of lamination with an adhesive, a method of coating the above-noted material of the displacement transmission member as solution, paste or slurry onto the piezoelectric/electrostrictive element 14, a method of bonding an organic adhesive film by heating, and so forth. Since an adhesive is unnecessary, the method of bonding an organic adhesive film by heating is preferable. In addition, in order to effectively utilize displacement of the piezoelectric/electrostrictive element 14, it is preferable to cut the layer of the displacement transmission member 12 into about the same shape as the piezoelectric/electrostrictive element 14 or to provide a notch.

Figure 8:
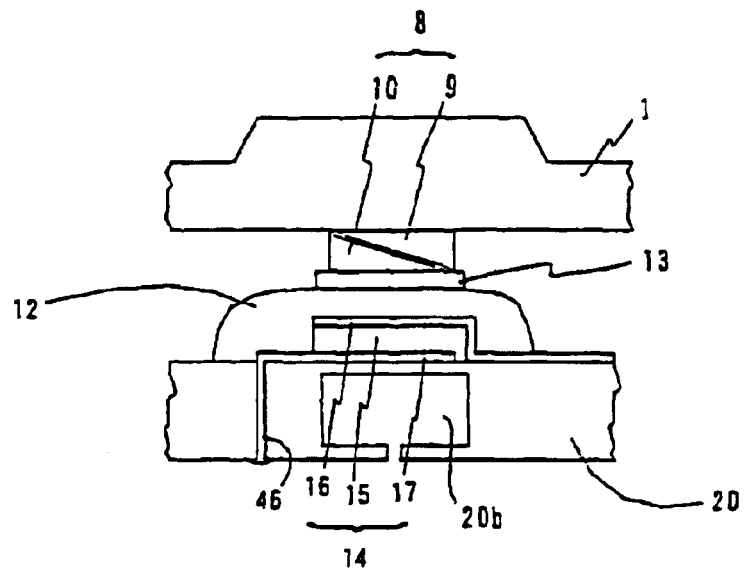
FIG. 8 is a partially enlarged view schematically showing another embodiment of an optical switch of the present invention.

In an optical switch where a light transmission channel is switched with an optical path-changing portion being provided with a specular reflector, it is preferable that a plate member 13 is further disposed on the displacement transmission member 12 as shown in FIG. 8 in consideration of maintaining the reflection angle of the optical path-changing member 10 at a predetermined angle.

As a material of the plate member 13, in order to maintain flatness of the plate member 13, a material in which ceramic powder such as alumina, zirconia, titania, glass or the mixture thereof is dispersed in epoxy-based, acrylic-based, silicone-based or the like organic resin, is preferable. In this case, it is preferable to have ceramic powder dispersed therein at 10 to 100 mass parts relative to 100 mass parts of organic resin.

On the other hand, the displacement transmission member 12 is not necessarily required. As shown in FIG. 7, displacement of the piezoelectric/electrostrictive element 14 may be directly transmitted to the light introduction member 9 without providing the displacement transmission member between the piezoelectric/electrostrictive element 14 and the optical path-changing portion 8.

(2) Piezoelectric/Electrostrictive Element

The piezoelectric/electrostrictive element 14 in the present invention has a piezoelectric/electrostrictive layer 15, and at least one pair of electrodes 16, 17 arranged on at least one part of the piezoelectric/electrostrictive layer 15. Here, "piezoelectric/electrostrictive" means piezoelectric and/or electrostrictive.

The piezoelectric/electrostrictive element 14 generates displacement by the application of voltage to the electrodes 16, 17. An element that achieves displacement in the thickness direction of the piezoelectric/electrostrictive layer 15, is preferable in the point that displacement of the piezoelectric/electrostrictive element 14 may be transmitted as is, as displacement or vibrations in the direction of the light transmission portion 1, to an optical path-changing portion 8.

The piezoelectric/electrostrictive element 14 may have a structure of having one piezoelectric/electrostrictive layer 15, or a structure of having multi-layered piezoelectric/electrostrictive layers 15 of two, three or more layers. When the structure has a multi-layered piezoelectric/electrostrictive layers 15, it is generally enough to dispose a pair of electrodes 16, 17 in every piezoelectric/electrostrictive layer 15. Alternatively, the piezoelectric/electrostrictive element 14 may have a so-called laminated (stacked) piezoelectric/electrostrictive element, where each piezoelectric/electrostrictive layer 15 and each electrode 16, 17 are laminated alternately.

As a material of the piezoelectric/electrostrictive layer 15, piezoelectric ceramics are preferable. However, the material may be electrostrictive ceramics, ferroelectric ceramics or antiferroelectric ceramics, and so forth. The material may either require polarization or not. Also, the material is not limited to ceramics, and may be a piezoelectric material consisting of polymer such as PVDF (polyvinylidene fluoride) and so forth, or a complex of the polymer and ceramics.

Specifically, piezoelectric ceramics or electrostrictive ceramics may include one of lead zirconate, lead titanate, lead magnesium niobate, lead nickel niobate, lead zinc niobate, lead manganese niobate, lead antimony stannate, lead manganese tungstate, lead cobalt niobate, barium titanate, sodium bismuth titanate, bismuth neodymiumtitanate (BNT system), potassium sodium niobate, strontium bismuth tantalate, and so forth singly, as a mixture, or as a solid solution thereof.

These ceramics are preferably a main component at 50 wt. % or more in the ceramic components constituting a piezoelectric/electrostrictive body. Particularly preferable materials are materials containing lead zirconate titanate (PZT system) as the main component, material containing lead magnesium niobate (PMN system) as the main component, material containing lead nickel niobate (PNN system) as the main component, materials containing a mixture or a solid solution of lead zirconate, lead titanate, and lead magnesium niobate as the main component, materials containing a mixture or a solid solution of lead zirconate, lead titanate, and lead nickel niobate as the main component, and materials containing sodium bismuth titanate as the main component in view of having high electromechanical coupling factor and piezoelectric/electrostrictive constant number and being easily capable of obtaining one having a stable material composition.

In the present invention, there may be employed ceramics further containing one or more oxides of lanthanum, calcium, strontium, molybdenum, tungsten, barium, niobium, zinc, nickel, manganese, cerium, cadmium, chromium, cobalt, antimony, iron, yttrium, tantalum, lithium, bismuth, tin, and so forth. For example, to a mixture of lead zirconate, lead titanate and lead magnesium niobate as the main component, is added lanthanum and/or strontium, which sometimes enables adjustment of coercive electric field or piezoelectric properties.

As antiferroelectric ceramics, preferable ceramics are: ceramics that have lead zirconate as a main component; ceramics that have a component consisting of a mixture or a solid solution of lead zirconate and lead stannate as a main component; ceramics that have lead zirconate as a main component with lanthanum oxide added thereto; and ceramics that have a mixture or a solid solution of lead zirconate and lead stannate as a main component with lead niobate added thereto.

The thickness of the piezoelectric/electrostrictive layer 15 is preferably 5 to 100 $\mu$m, more preferably 5 to 50 $\mu$m, and further preferably 5 to 30 $\mu$m. Moreover, the piezoelectric/electrostrictive layer 15 may be either dense or porous. When the layer is porous, the porosity is preferably less than 40%.

The electrodes 16, 17 may include, as shown in FIG. 1, FIG. 8 and so forth, the first electrode 16 formed on at least one part of a surface of the piezoelectric/electrostrictive layer 15 on the side of the optical path-changing portion 8, and the second electrode 17 formed at least one part of a surface of the piezoelectric/electrostrictive layer 15 on the side of the substrate 20 as mentioned above. The first and second electrodes 16, 17 can be formed in a comb shape on either or both surfaces of the piezoelectric/electrostrictive layer 15 on the side of the optical path-changing portion 8 or the substrate 20 as shown in FIG. 9 (FIG. 9 showing an optical switch formed on a surface on the side of the optical path-changing portion 8), and so forth.

As a material for the electrodes 16, 17, a conductive metal that is generally solid at room temperature is employed. It is preferable to employ, for example, a single metal or alloy of two or more kinds selected from aluminum, titanium, chromium, iron, cobalt, nickel, copper, zinc, niobium, molybdenum, ruthenium, palladium, rhodium, silver, tin, tantalum, tungsten, iridium, platinum, gold, lead and so forth, or a combination of two or more systems thereof.

Also, the material may be a mixture of these materials and aluminum oxide, zirconium oxide, silicon oxide, glass, a piezoelectric/electrostrictive material or the like, or a cermet thereof.

Upon selection of these materials, it is preferable to select a material for the first electrode 16 and the second electrode 17, depending on a method of manufacturing the piezoelectric/electrostrictive element 14, described later.

For example, for an electrode formed before heat treatment of the piezoelectric/electrostrictive layer 15, a material containing a platinum group metal such as platinum, rhodium and palladium is preferable among the materials since the metal has resistance under a high-temperature oxide atmosphere during the heat treatment of the piezoelectric/electrostrictive layer 15. An electrode material is more preferable that has a platinum group metal such as platinum, rhodium and palladium, or an alloy containing the platinum group metal such as silver-platinum, platinum-palladium and platinum-silver-palladium as a main component. On the other hand, for an electrode after heat treatment of the piezoelectric/electrostrictive layer 15, there may be used a metal having low melting point, such as aluminum, gold, or silver.

In case of the piezoelectric/electrostrictive element 14 in which the first electrode 16 and the second electrode 17 are formed on a surface of the piezoelectric/electrostrictive layer 15 on the side of the optical path-changing portion 8 or the substrate 20 as shown in FIG. 9, it is preferable to form both the first electrode 16 and the second electrode 17 from the same material.

Also, the electrodes 16, 17 may have an appropriate thickness, depending on the purposes, but preferably 0.1 to 50 µm in thickness.

A method of forming the piezoelectric/electrostrictive element 14 on the vibrating member 18 may include: (1) a method of forming a precursor of the piezoelectric/electrostrictive layer 15 by a press molding method with a mold or a tape forming method with slurry materials and so forth, preliminarily forming the electrodes 16, 17 on the precursor of the piezoelectric/electrostrictive layer 15 by a film forming method, thermo-compression bonding the precursor of the piezoelectric/electrostrictive layer 15 and the electrodes 16, 17 to the vibrating member 18, and co-firing the precursor of the piezoelectric/electrostrictive layer 15, the electrodes 16, 17 and the unfired vibrating member 18. (2) a method of forming a precursor of the piezoelectric/electrostrictive layer 15 by a press molding method with a mold or a tape forming method with slurry materials and so forth, preliminarily forming the electrodes 16, 17 on the precursor of the piezoelectric/electrostrictive layer 15 by a film forming method, firing the precursor of the piezoelectric/electrostrictive layer 15 and the electrodes 16, 17 to prepare a sintered piezoelectric/electrostrictive element 14, and bonding the sintered piezoelectric/electrostrictive element 14 to the substrate 20 that has the vibrating member 18 and the fixing member 19 integrally by firing. (3) a method of forming the second electrode 17, the piezoelectric/electrostrictive layer 15 and the first electrode 16 sequentially on the sintered vibrating member 18 by a film forming method, and then firing all the layers 17, 15, and 16 simultaneously or firing each of the layers 17, 15, and 16 each time, and so forth. Among these methods, the method (3) is preferable.

The word "precursor" here means a thing which has a material constituting a piezoelectric/electrostrictive layer 15 as the main component and which becomes a piezoelectric/electrostrictive body by a thermal treatment or being fired. In addition, the word "precursor" for an electrode or the like, which is described later, likewise means a thing which becomes an electrode or the like by a thermal treatment or the like.

As a film forming method, there may be employed, for example, thick film methods such as screen printing, dipping, electrophoresis, spraying or coating; or thin film methods such as ion beam, sputtering, vacuum deposition, ion plating, chemical vapor deposition (CVD) and plating; and so forth. Among them, thick film methods such as screen printing are preferable.

The thick film methods such as screen printing have advantages which include being able to simultaneously form leads to electrodes and terminal pads and the piezoelectric/electrostrictive layer 15 may be formed by using paste or slurry having ceramic particles as a main component, so that preferable piezoelectric characteristics may be obtained. Also, the piezoelectric electrostrictive element 14 and the vibrating member 18 may be joined integrally without using an adhesive, so that the methods are highly reliable and reproducible and, furthermore, they may be easily integrated.

Moreover, in case of forming patterns in a desirable shape by a film forming method, predetermined patterns may be formed by screen printing, photolithography, and so forth. Patterns may be formed by removing unnecessary parts by machining such as laser beam machining, slicing and ultrasonic machining. However, in accordance with industrial viewpoints, screen printing is preferable. Additionally, the electrodes 16, 17 may be formed by a method of forming electrodes through a through-hole 46 as shown in FIG. 8.

Firing temperature of the films may be properly determined, depending on the materials thereof, but the temperature is generally 500 to 1400° C. Particularly, for the piezoelectric/electrostrictive layer 15, 1000 to 1400° C. is preferable. Additionally, it is preferable to fire the piezoelectric/electrostrictive layer 15 in the presence of a source of vaporization which controls vapor pressure of components constituting the piezoelectric/electrostrictive layer.

Moreover, any shape may be adapted for the piezoelectric/electrostrictive layer 15, the first electrode 16 and the second electrode 17, depending on the purposes. The shapes may include, for instance, polygons such as a triangle and square, curves such as a circle, ellipse and ring, comb shapes, lattice shapes, or the combination thereof.

The piezoelectric/electrostrictive layer 15, the first electrode 16, and the second electrode 17 formed on the substrate 20 may be formed integrally with the substrate 20 treating each of the layers 17, 15, and 16 with heat every time after formation of each of the layers 17, 15, and 16 as described above. Alternatively, after forming all the layers 17, 15, and 16, these layers 17, 15, and 16 may be simultaneously treated with heat to integrate them with the substrate 20. Additionally, in case of forming the first electrode 16 and the second electrode 17 by a thin film method, heat treatment is not always necessary to integrate these electrodes.

Subsequently, as a modification of the piezoelectric/electrostrictive element 14 of the present invention, a so-called laminated (stacked) piezoelectric/electrostrictive element will be explained.

As shown in FIG. 10, this piezoelectric/electrostrictive element 34 is a laminate which includes an anode layer 22 in which a plurality of layers functioning as anodes are linked, and a cathode layer 23 in which a plurality of layers functioning as cathodes are linked, and both are alternately laminated with the piezoelectric/electrostrictive layer 24 therebetween.

Figure 10A:
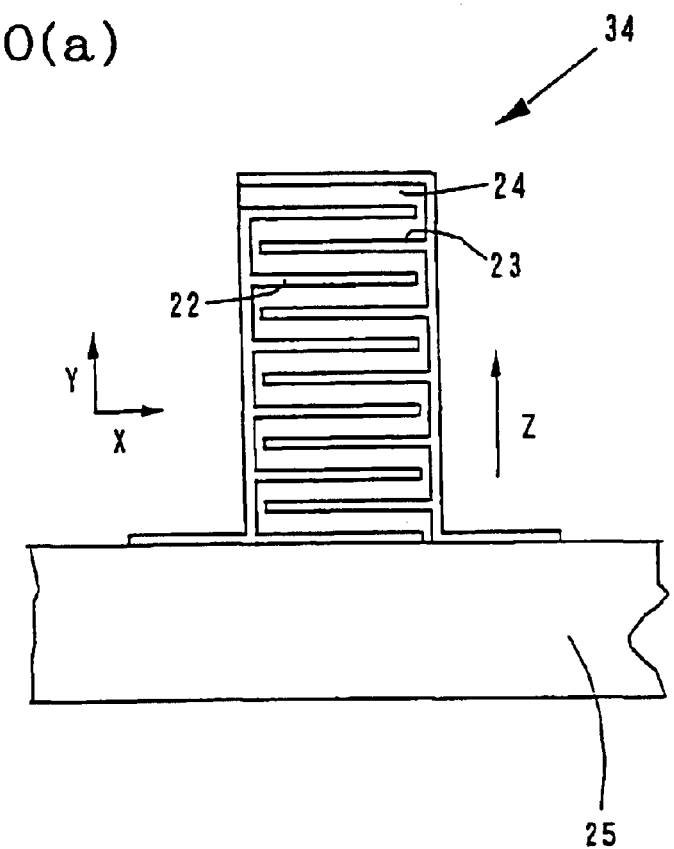
FIGS. 10(a) and (b) are cross-sectional views schematically showing a modification of an actuator member in an actuator portion constituting an optical switch of the present invention.

The piezoelectric/electrostrictive element 34 can utilize displacement in the Y direction, which is a direction of lamination, and in the X direction, which is a direction perpendicular to the direction of lamination. However, as shown in FIG. 10(a), in the case of utilizing displacement in the Y direction of a laminate direction, it is preferable to make the piezoelectric/electrostrictive element 34 longer in the Y direction, direction of lamination, than in the X direction, direction perpendicular to the direction of lamination. This is because, when direction Z of displacement is Y direction, the amount of displacement is a total of displacements in a thickness direction of each piezoelectric/electrostrictive layer.

Figure 10B:
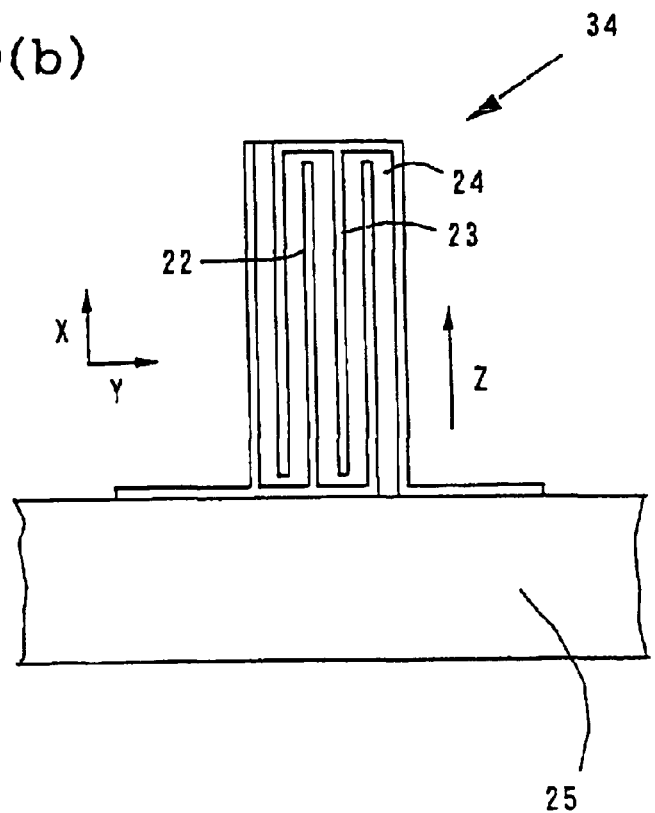
FIG. 10(b) shows an embodiment of a piezoelectric/electrostrictive element using a displacement in the X direction, which is a direction perpendicular to a direction of lamination.

On the other hand, in utilizing displacement in the X direction, which is a direction perpendicular to the direction of lamination, as shown in FIG. 10(b); the piezoelectric/electrostrictive element 34 is preferably longer in the X direction, than in the Y direction, which is a direction of lamination. The amount of displacement becomes a displacement in proportion with the length of each piezoelectric layer 21 in the X direction.

In addition, if a size in a direction different from the direction Z of displacement, i.e., X direction in a piezoelectric/electrostrictive element 34 shown in FIG. 10(a) or Y direction in a piezoelectric/electrostrictive element 34 shown in FIG. 10(b) is large, stress of a distortion in the direction becomes large, which influences occurrence of the main displacement (displacement in Z direction).

As a method for producing such a laminated piezoelectric/electrostrictive element 34, there may be employed the following method.

Figure 11:
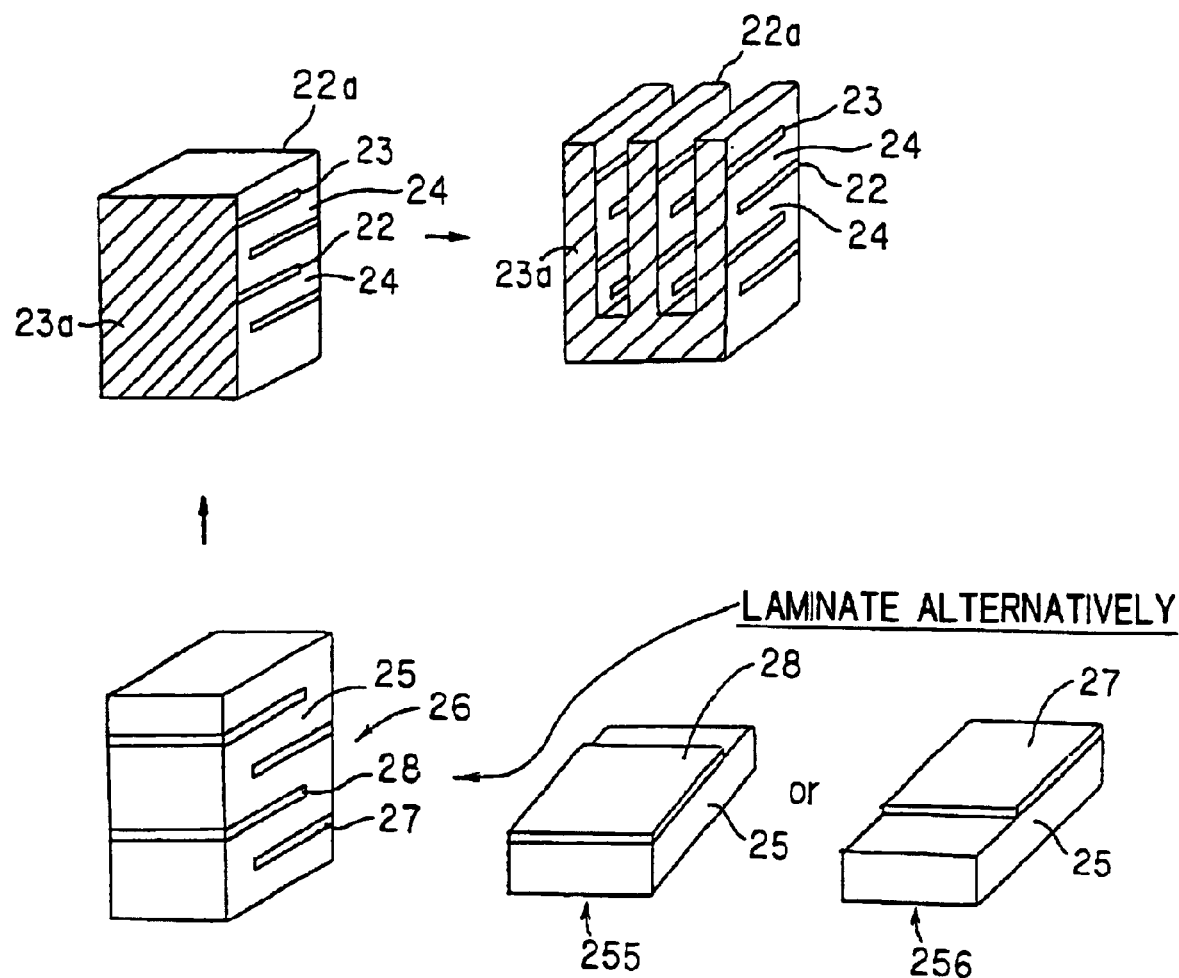
FIG. 11 is an explanatory view schematically showing an embodiment of a method for producing a laminated piezoelectric/electrostrictive element.

As shown in FIG. 11, a precursor 25 of a piezoelectric/electrostrictive layer is formed by the press molding method or tape forming method with slurry materials and so forth mentioned above. On the obtained precursor 25, precursors 27 and 28 of electrode layers each having predetermined pattern are formed by a film-forming method such as screen printing to obtain complex precursors 255 and 256.

Next, these complex precursors 255 and 256 are subjected to alternate lamination and compression bonding to obtain a laminated body 26 having a predetermined number of each of the layers. Then, the laminated body 26 is fired.

Then, the fired laminated body 26 is cut to expose each of the electrode layers 22 and 23 to one of the two surfaces in parallel with the direction of lamination and facing each other.

Then, each of joint layers 22a and 23a is formed on each of the surfaces where each of the electrode layers 22 and 23 are exposed by the aforementioned film-forming method such as screen printing. The joint layers 22a and 23a are fired and each of the electrode layers 22, which functions as an anode, are joined with other electrode layers 22, and each of the electrode layers 23, which functions as a cathode, are joined with other electrode layers 23 to obtain a laminated piezoelectric/electrostrictive element 34.

The thus obtained laminated piezoelectric/electrostrictive element 34 is preferably cut in a direction of lamination so that portions to serve as a common fixing member 19 are left at constant intervals. By this method a plurality of laminated piezoelectric/electrostrictive elements 34 can easily be produced on the same fixing member 19. In such a laminated piezoelectric/electrostrictive element 34, the fixing member 19 can be commonly used, and the vibrating member 18 is not always necessary. Therefore, reducing the number of switch parts can be accomplished in some applications.

In the case of forming a plurality of laminated piezoelectric/electrostrictive element 34 by such a method, it is preferable that at least one of the joint layers 22a and 23a is preferably formed with being separated in each element.

In such a laminated piezoelectric/electrostrictive element 34, the laminated body 26 may be formed by screen printing in addition to press molding methods, tape forming methods, or the like.

It is preferable that the electrode layers 22 and 23 constituting a part of the piezoelectric/electrostrictive element 34 are formed of metal having, in particular, resistance in an oxidizing atmosphere at high temperature in the case when the electrode layers are subjected to a heat treatment simultaneously with or at about the same temperature as that for firing of the piezoelectric/electrostrictive layer 24. The cutting process where these electrode layers 22 and 23 are exposed may performed to the laminated body 26 before being fired.

Further, the joint layers 22a and 23a formed after firing the laminated body 26 may be formed with a material different from that of the electrode layers 22 and 23. The method for producing the laminated piezoelectric/electrostrictive element 34 is similar to that of a general piezoelectric/electrostrictive element except for the aforementioned matters, and description for such matters is omitted here.

(3) Vibrating Member, Fixing Member

The vibrating member 18 in the present invention is in contact with at least one part of the piezoelectric/electrostrictive element 14 to support piezoelectric/electrostrictive element 14, and converts strain of a piezoelectric/electrostrictive layer into bending displacement or vibrations.

The vibrating member 18 is preferably in a plate shape since this is a shape that is likely to vibrate into the direction of the light transmission portion 1. In this case, the thickness of the vibrating member 18 is preferably the same dimension as the thickness of the piezoelectric/electrostrictive layer 15 described above. Thus, the vibrating member 18 is likely to follow sintering shrinkage of the piezoelectric/electrostrictive layer 15, so that stress at an interface between the piezoelectric/electrostrictive layer 15 or the electrode layers 16, 17 and the vibrating member 18 decreases and the layer and the member may be easily integrated.

Specifically, the member is preferably in the thickness of 1 to 100 $\mu$m, more preferably in the thickness of 3 to 50 $\mu$m, and further preferably in the thickness of 5 to 20 $\mu$m. Also, a ratio of thickness in comparison with the piezoelectric/electrostrictive layer 15 (vibrating member: piezoelectric/electrostrictive layer) is preferably 1:0.5 to 1:10, and more preferably 1:1 to 1:5.

It is preferable that the vibrating member 18 directly supports the piezoelectric/electrostrictive element 14 without a material such as an inorganic or organic adhesive in consideration of degeneration with the passage of time, heat resistance and weather resistance.

Also, it is preferable that a material of the vibrating member 18 is highly heat resistant in order to prevent the vibrating member 18 from degenerating during forming the piezoelectric/electrostrictive layer 15 or the like. Moreover, the vibrating member 18 preferably consists of an electric insulating material to maintain an electrical separation of the electrodes 16, 17 and so forth when the electrodes 16, 17 of the piezoelectric/electrostrictive element 14 are directly supported thereby, and leads and lead terminals that are connected thereto, etc. are formed on a surface of the vibrating member 18.

Specifically, the member consisting of a highly heat resistant metal or porcelain enamel or the like in which a surface of the metal is coated with ceramics such as glass, or the member consisting of ceramics or the like may be employed. Among them, the member consisting of ceramics is preferable.

Ceramics constituting the vibrating member 18 may include, for example, stabilized zirconium oxide, aluminum oxide, magnesium oxide, mullite, aluminum nitride, silicon nitride, glass, and so forth. Among these, stabilized zirconium oxide is preferable since it has high mechanical strength, toughness and little chemical reaction to a piezoelectric/electrostrictive layer and electrodes.

Furthermore, it is preferred that the stabilized zirconium oxide contains aluminum oxide at 0.1 to 5 mole %.

The stabilized zirconium oxide includes stabilized zirconium oxide and partially stabilized zirconium oxide. The stabilized zirconium oxide is distinguished from zirconium oxide that often generates cracks during a phase transformation between monoclinic crystals and tetragonal crystals at around 1000° C., since it has a cubic crystal structure or the like and does not generate the phase transformation.

The stabilized zirconium oxide may include ones that contain a stabilizer such as calcium oxide, magnesium oxide, yttrium oxide, scandium oxide, ytterbium oxide, cerium oxide or rare earth metal oxides at 1 to 30 mole %. In order to improve the mechanical strength of a vibrating member, stabilized zirconium oxide containing yttrium oxide is preferable. In this case, yttrium oxide is preferably contained at 1.5 to 6 mole %, or more preferably 2 to 4 mole %.

Additionally, a crystal phase of ceramics constituting the vibrating member 18 may be a mixed phase of cubic crystals and monoclinic crystals, a mixed phase of tetragonal crystals and monoclinic crystals, a mixed phase of cubic crystals, tetragonal crystals and monoclinic crystals, and so forth. Among them, a tetragonal crystal phase, or a mixed phase of tetragonal crystals and cubic crystals is preferable in consideration of strength, toughness and durability.

When the vibrating member 18 is made of ceramics, the member is composed of a plurality of crystal grains. The average size of the crystal grains is preferably 0.05 to 2 μm, or more preferably 0.1 to 1 μm, to improve the mechanical strength of the vibrating member 18.

Subsequently, the fixing member 19 will be explained. The fixing member 19 in the present invention fixes at least one part of the vibrating member 18 so as to vibrate the vibrating member 18.

The fixing member 19 preferably consists of ceramics, but may be the same or different ceramics from the material of the vibrating member 18. There may be employed, for instance, ceramics such as stabilized zirconium oxide, aluminum oxide, magnesium oxide, titanium oxide, mullite, spinel, aluminum nitride, silicon nitride, glass, or the like. Among them, a ceramic material having zirconium oxide as a main component, a ceramic material having aluminum oxide as a main component, or a ceramic material having a mixture thereof is more preferable.

Although clay or the like is sometimes added as a firing (sintering) aid when the vibrating member 18 or the fixing member 19 is made of ceramics, it is preferable that a component that is likely to be vitrified, such as silicon oxide and boron oxide, is not contained in the ceramics excessively. An excessive amount of a component that is likely to be vitrified is advantageous in joining to the piezoelectric/electrostrictive element 14. However, it becomes difficult to maintain a composition of a predetermined piezoelectric/electrostrictive layer because of promotion of reaction between the vibrating member 18 and a piezoelectric/electrostrictive layer upon being fired, thus resulting in the decrease in element characteristics. Specifically, it is preferable to adjust a percentage content of a material that is likely to be vitrified, such as silicon oxide and boron oxide, in a substrate, at less than 3 wt. %, or more preferably less than 1 wt. %.

It is preferable that the vibrating member 18 and the fixing member 19 are integrated to constitute the substrate 20 consisting of ceramics. Furthermore, a recessed portion 20a shown in FIG. 1 and the like or a hollow portion 20b shown in FIG. 2 and the like (hereinbelow sometimes referred to as recessed portion 20a and the like for convenience of explanation) is preferably formed with giving the vibrating member 18 a thin structure. However, it is not necessarily required to constitute the vibrating member 18 and the fixing member 19 integrally. The fixing member 19 made of a metal, for instance, stainless steel, iron and so forth, may fix the vibrating member 18 made of ceramics. In this case, there may be employed a method where a surface of the vibrating member 18 is metallized and the obtained metallized layer is joined to the fixing member 19 by brazing, or the like.

In addition, in an optical switch without a vibrating member as a substrate as shown in FIG. 10, the substrate is preferably constituted with a material having the same component as a piezoelectric/electrostrictive layer. It is more preferable that the substrate has the same component and the same composition. A substrate of such a material can easily be bonded unitarily with a piezoelectric/electrostrictive layer.

There is no particular limitation on a shape of the recessed portion 20a, or the like, formed in the substrate 20. The recessed portion may be, for instance, circular, elliptic, or polygonal such as square and rectangular, or the combination thereof. However, in case of a polygonal shape, the corners are preferably trimmed in a round ridge.

In the case that it is constituted as the recessed portion 20a, there is no particular limitation on its thickness (height), and it may be thick or thin. Though the thickness is generally determined according to an object of use of the hollow portion, it is preferable that it is thin without having higher thickness than it needs for functioning of the actuator portion. Particularly when it is constituted as a hollow portion, the thickness is preferable about the size of a displacement of an actuator portion to be used. By such a constitution, bending of the vibrating member is limited by a bottom portion of the hollow portion adjacent to the vibrating member in the direction of bending, and thereby the vibrating member is effectively prevented from being destroyed against application of unintended external force. It is also possible to stabilize displacement of the actuator portion at a specified amount by making use of the effect of the limitation of bending. Further, since a thickness of the actuator portion itself is decreased to make bending rigidity small; warpage or the like of the actuator portion itself is effectively corrected upon bonding/fixing the actuator portion to a light transmission portion, which can improve reliability in bonding/fixing. In addition, a volume of raw material can be reduced upon production. Thus, the constitution is advantageous also in view of production cost as well as in planning to lighten the actuator portion.

Specifically, the hollow portion 20b preferably has a thickness of 3–50 μm, more preferably 3–20 μm.

As a method of forming the substrate 20 by sintering the vibrating member 18 and the fixing member 19 for integration, a method of laminating layers such as a green sheet or a green tape by thermo compression bonding and subsequently sintering the layers, or the like, may be employed.

A method of forming the recessed portion 20a or the like with giving the vibrating member 18 a thin structure may be: A method of preliminarily providing a through-hole in a predetermined shape so as to form the recessed portion 20a or the like in a second layer before lamination in case of laminating, for instance, two green sheets or green tapes. A method of providing the recessed portion 20a by machining such as grinding, laser machining, punching by press machining, etc., in a molded body obtained by pressure molding with a mold, casting, injection and so forth; or the like.

Figure 12:
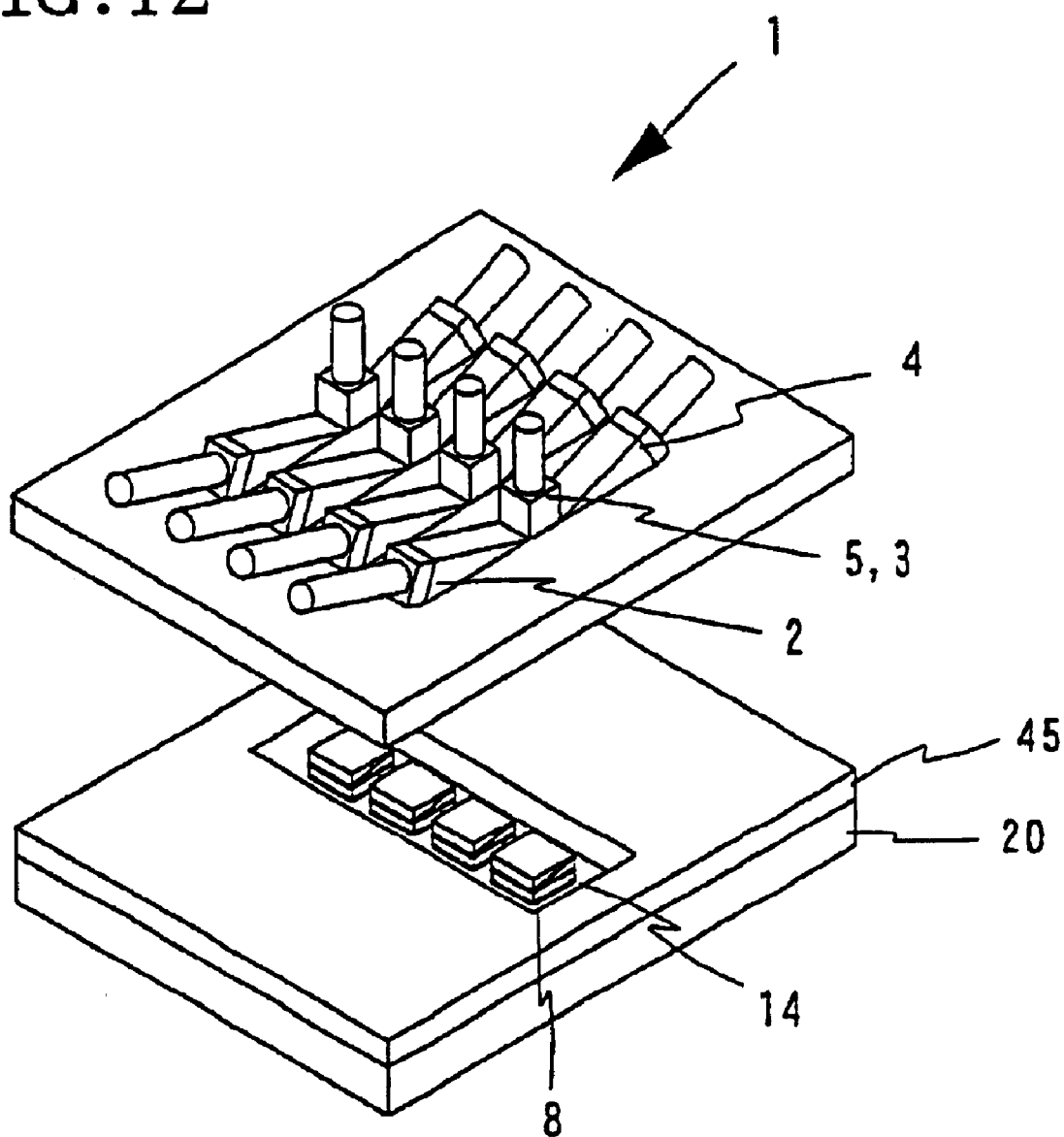
FIG. 12 is an explanatory view schematically showing one embodiment of a multichannel optical switch of the present invention.

Moreover, in the optical switch of the present invention, it is preferable that the light transmission portion 1 and the substrate 20 are fixed with a distance between the light transmission portion 1 and the optical path-changing portion 8 by arranging a clearance forming member 45 on the substrate 20 as shown in FIG. 12. In this case, as shown in FIG. 11, the clearance forming member 45 may be formed on an entire surface of the substrate 20, except for a region where the piezoelectric/electrostrictive element 14 is arranged. However, the member is preferably formed in patterns so as to equalize a distance between the light transmission portion 1 and the optical path-changing portion 8.

The optical switch in the present invention may contact or separate (off-contact) a single optical path-changing portion 8 from the light transmission portion 1 by displacement of a single actuator portion 11 described above, but the switch may contact or separate a single optical path-changing portion 8 from the light transmission portion 1 by displacement of a plurality of the actuators 11.

4. Multichannel Optical Switch

A multichannel optical switch according to the present invention is a multichannel optical switch provided with a plurality of optical switches each comprising at least a light transmission portion, an optical path-changing portion and an actuator portion. The light transmission portion has a light reflecting plane provided on at least one part of a plane facing the optical path-changing portion to totally reflect light, and light transmission channels having optical wave guiding bodies and being provided in at least three directions with the light reflecting plane as a starting point The optical path-changing portion is positioned in proximity to the light reflecting plane of the light transmission portion in a movable condition and has an optical path-changing member for at least reflecting or scattering light. The actuator portion has a mechanism that is displaced by external signals and transmits the displacement to the optical path-changing portion. The switching or dividing of an optical path is carried out by contacting or separating the optical path-changing portion to or from the light reflecting plane of the light transmission portion by displacement of the actuator portion in response to the external signals. An optical path where the input light from the light transmission channels is totally reflected at the light reflecting plane of the light transmission portion and it is transmitted to a specific light transmission channel on an output side when the optical path-changing portion is separated from the light reflecting plane of the light transmission portion. Additionally, an input light from the light transmission channel can be reflected or scattered at the optical path-changing portion, and transmitted to a specific one or more light transmission channel(s) on the output side when the optical path-changing portion is contacted to the light reflecting plane of the light transmission portion.

Each component of the multichannel optical switch in the present invention is the same as those already mentioned for the optical switches. Accordingly, the description of each component is omitted herein, and specific embodiments of multichanneling will be shown.

In the present specification, "multichannel" indicates that there are a plurality of locations where optical switching is performed by switching an optical path between a light reflecting plane of the aforementioned light transmission portion and a light reflection member of an optical path-changing portion. The so-called "multichannel optical switch" herein includes the ones in which each component is shared between optical switches.

One embodiment in the present invention may include a multichannel optical switch in which a plurality of optical switches shown in, for instance, FIG. 1 to FIG. 3 are arranged in a row as in FIG. 12. The multichannel optical switch performs optical switching in which an optical path of the light input to one input-side light transmission channel 2 is optionally switched and the light is transmitted to two or more output-side light transmission channels 4, 5. Or, the multichannel optical switch performs optical switching in which an optical path of each light input to two or more input-side light transmission channels 2, 3 is optionally switched and the light is transmitted to one output-side light transmission channel 4. Such a multichannel optical switch has advantages in that the structure is simple and multichanneling is easy.

An input side and an output side are distinguished simply in relation to the traveling direction of light. Even in the same configuration, input and output are differently termed by reversing a traveling direction.

Figure 13:
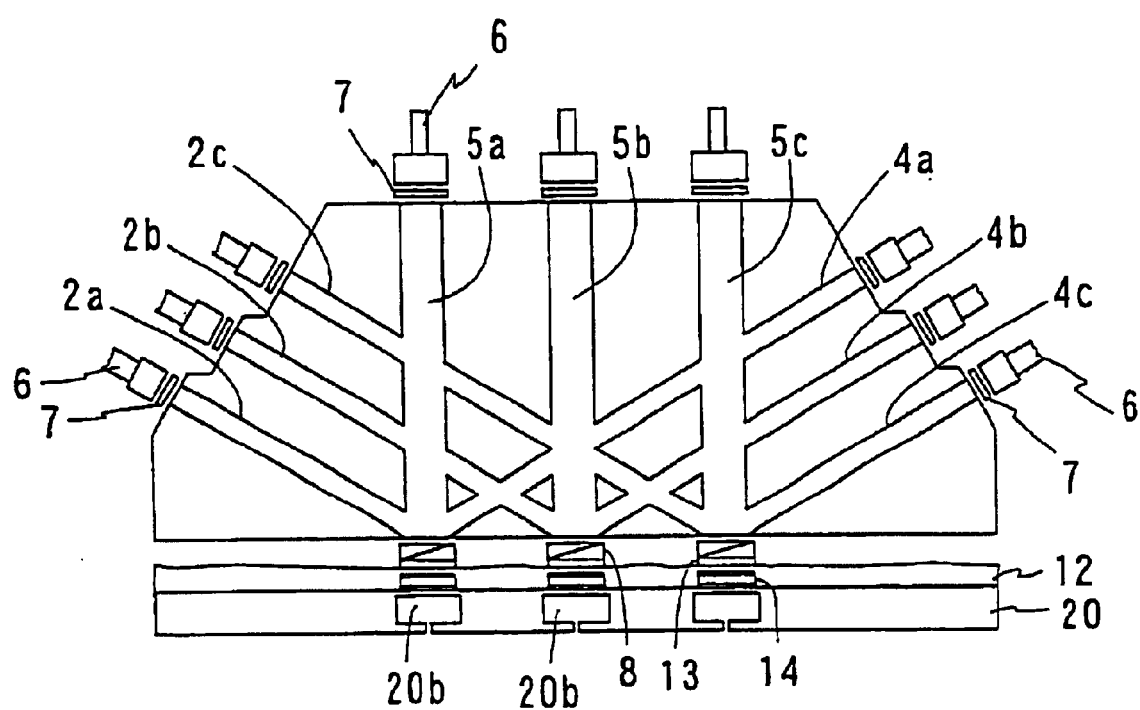
FIG. 13 is an explanatory view schematically showing another embodiment of a multichannel optical switch of the present invention.

Another embodiment in the present invention may include a multichannel optical switch formed with each light transmission channel 2a to 2c, 4a to 4c, 5a to 5c in a plurality of optical switches in a single light transmission portion 1 as shown in FIG. 13. It is preferable that each light transmission channel 2a to 2c, 4a to 4c, 5a to 5c, is formed as an optical waveguide since the light transmission channels 2a to 2c, 4a to 4c, 5a to 5c can be mutually arranged in proximity in such a multichannel optical switch. Also, each light transmission channel in a plurality of optical switches is mutually crossed so as to share a part of each light transmission channel 2a to 2c, 4a to 4c, 5a to 5c, thus greatly miniaturizing and integrating an optical switch.

Figure 14:
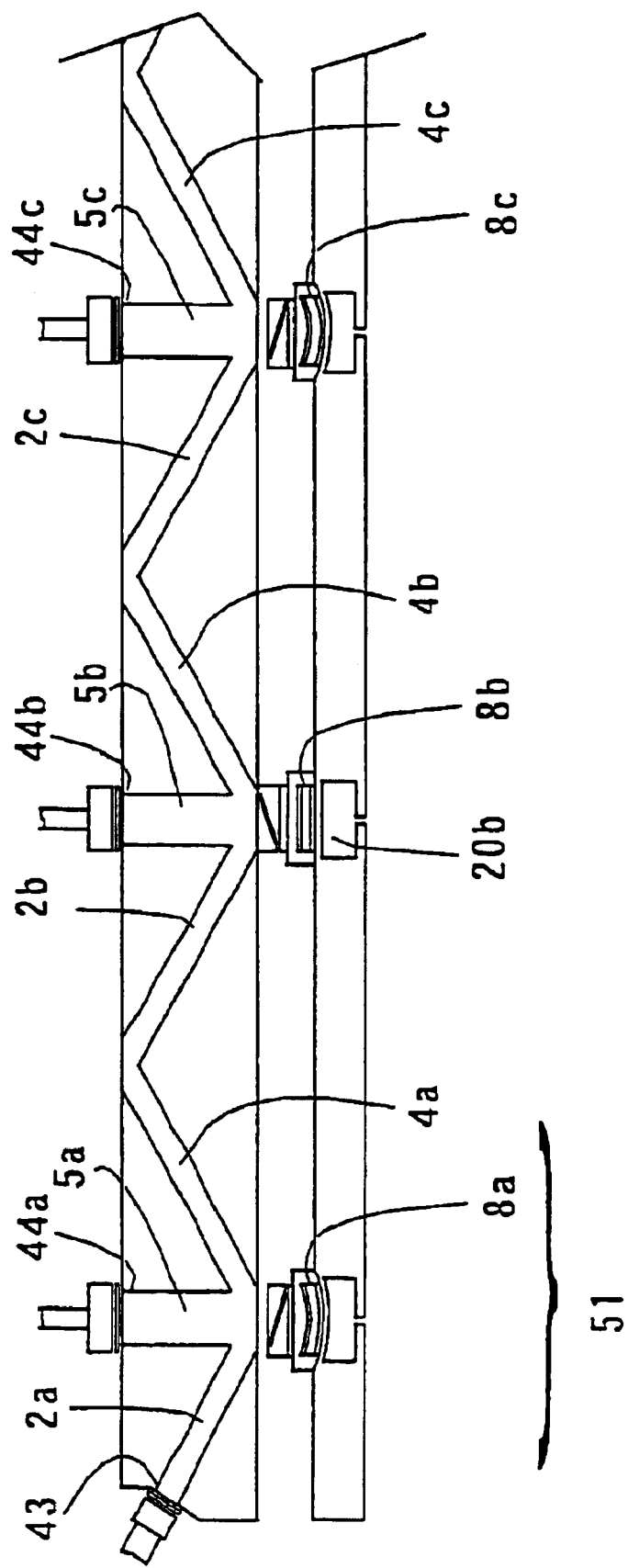
FIG. 14 is an explanatory view schematically showing another embodiment of a multichannel optical switch of the present invention.
Figure 15:
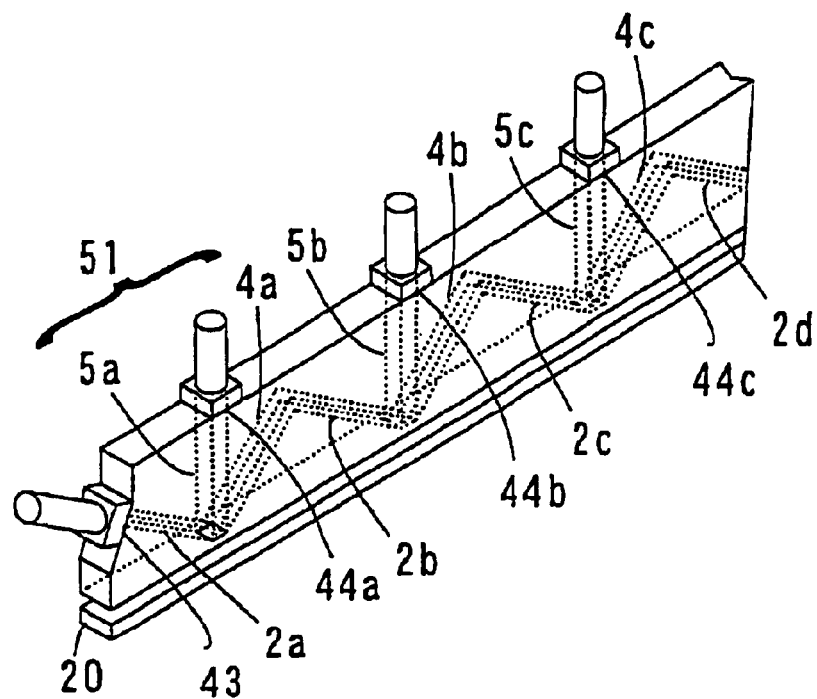
FIG. 15 is an explanatory view schematically showing another embodiment of a multichannel optical switch of the present invention.

Furthermore, as shown in FIGS. 14 and 15, another embodiment of the present invention may be a multichannel optical switch in which a plurality of optical switches 51 are constituted by a plurality of optical switches having one input channel 2a to 2c and a plurality of output channels 4a to 4c, 5a to 5c, and one output channel 4a, 4b, 4c is linked with an input channel 2a, 2b, 2c respectively between adjacent optical switches 51, to perform switching of the light input from an input end portion of one optical switch in each optical path-changing portion of a plurality of optical switches including the optical switch.

The multichannel optical switch shown in FIG. 14 has an advantage in that signal loss is small in light transmission since light transmission channels 2a, 2b, 2c, 4a, 4b, 4c are composed of an optical waveguide. On the contrary, the multichannel optical switch shown in FIG. 15 has an advantage in that design is simple since the light transmission portion as a whole is composed of an optical wave guiding body of the same material (the optical waveguide is excluded) and, in an essential sense, specific light transmission channels 2a to 2c, 4a to 4c, 5a to 5c are formed.

In these multichannel optical switches, an optical path of the light input from an input end 43 is switched at each optical path-changing portion 8a, 8b, 8c (not shown in FIG. 15) of a plurality of optical switches. The light is emitted from an output end 44a, 44b, 44c and transmitted to an external signal channel.

Figure 16:
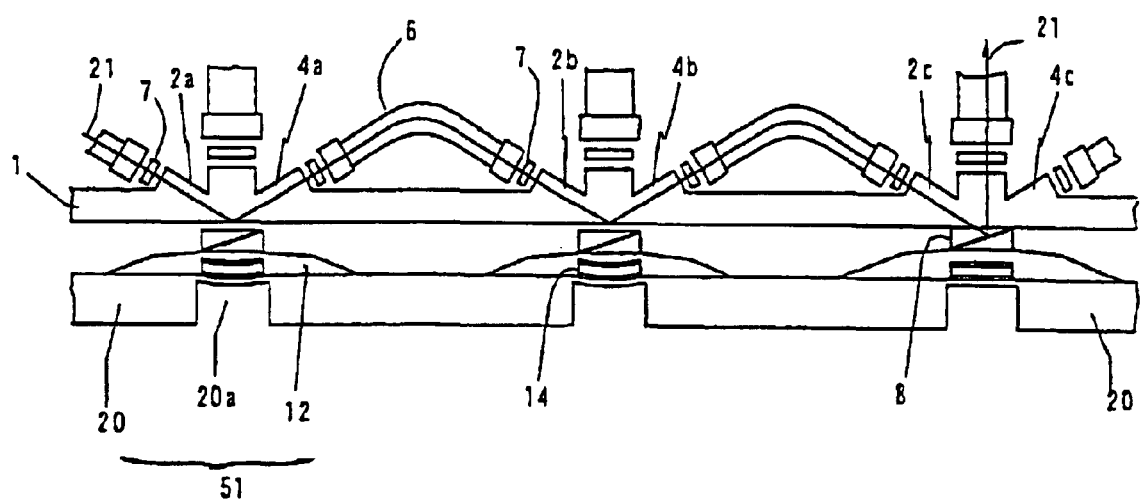
FIG. 16 is an explanatory view schematically showing another embodiment of a multichannel optical switch of the present invention.

Further, as shown in FIG. 16, another embodiment of the present invention may be a multichannel optical switch where a plurality of optical switches 51 join one output channel 4a, 4b with input channel 2b, 2c, respectively, between adjacent optical switches 51 by an optical fiber 6 to perform switching of light input from input end of at least one optical switch in an optical path-changing portion of a plurality of optical switches.

According to this multichannel optical switch, similarly to the multichannel optical switch shown in FIG. 15, since the light transmission portion as a whole can be composed of an optical wave guiding body of the same material (the optical waveguide is excluded), it is easily designed. In addition, since optical transmission is performed with an optical fiber, the multichannel optical switch is more advantageous in suppressing divergence of light in comparison to that shown in FIG. 15.

In this multichannel optical switch, it is preferable to unitarily form the light transmission portion 1 of each optical switch 51 in view of simplifying the design. However, the multichannel optical switch may be the one in which each optical transmission portion 1 of the optical switches 51 is independently formed.

Figure 17:
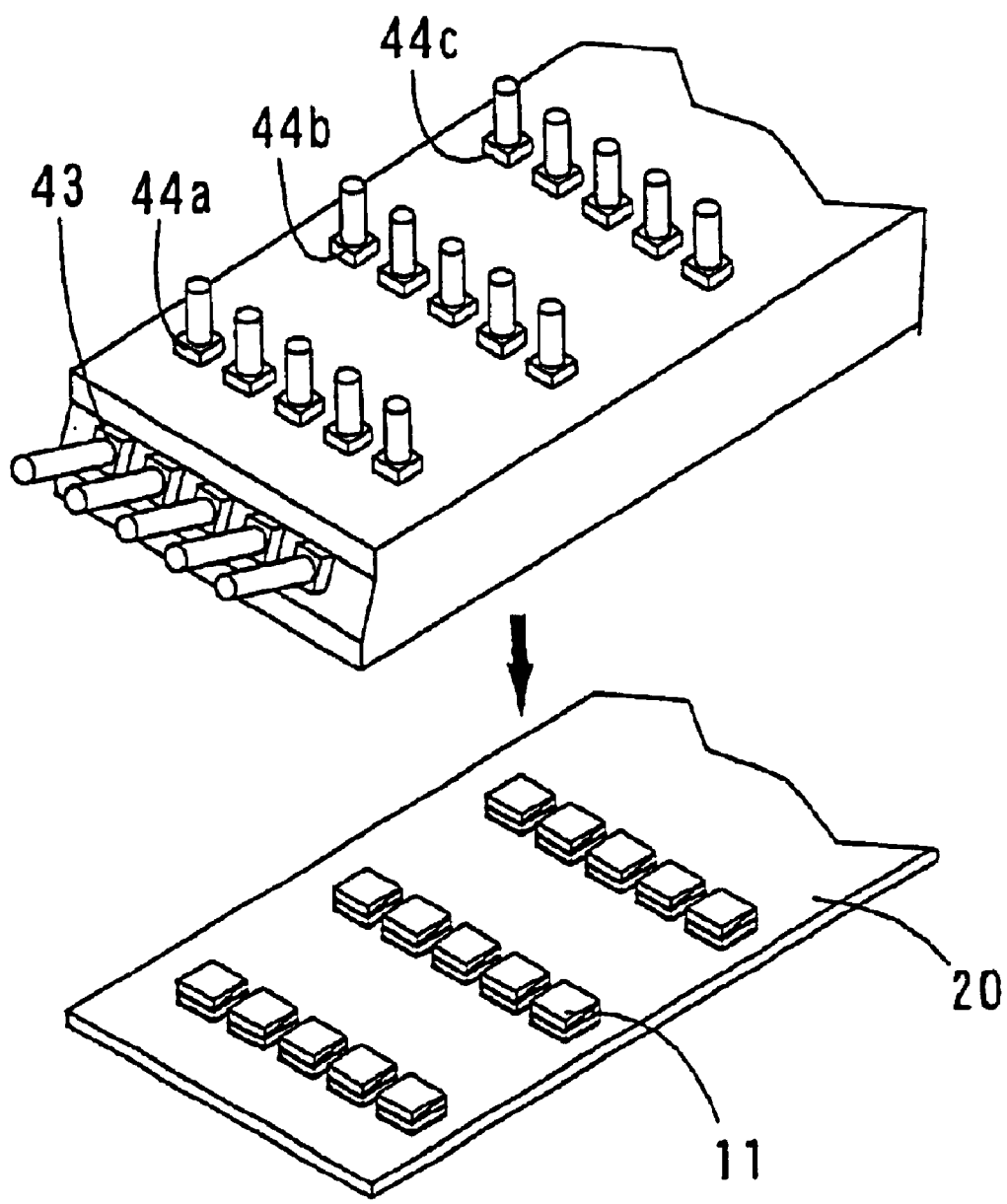
FIG. 17 is an explanatory view schematically showing another embodiment of a multichannel optical switch of the present invention.

Furthermore, another embodiment of the present invention may include a multichannel optical switch in which a plurality of the multichannel optical switches shown in FIGS. 14 to 16 described above are arranged in a row as shown in FIG. 17.

This multichannel optical switch has an advantage in that a large-scale multichanneled optical switch may be easily manufactured since a plurality of light-signal input ends and/or light-signal output ends may be easily provided, and the size is easily reduced since the configuration is simple.

Figure 18:
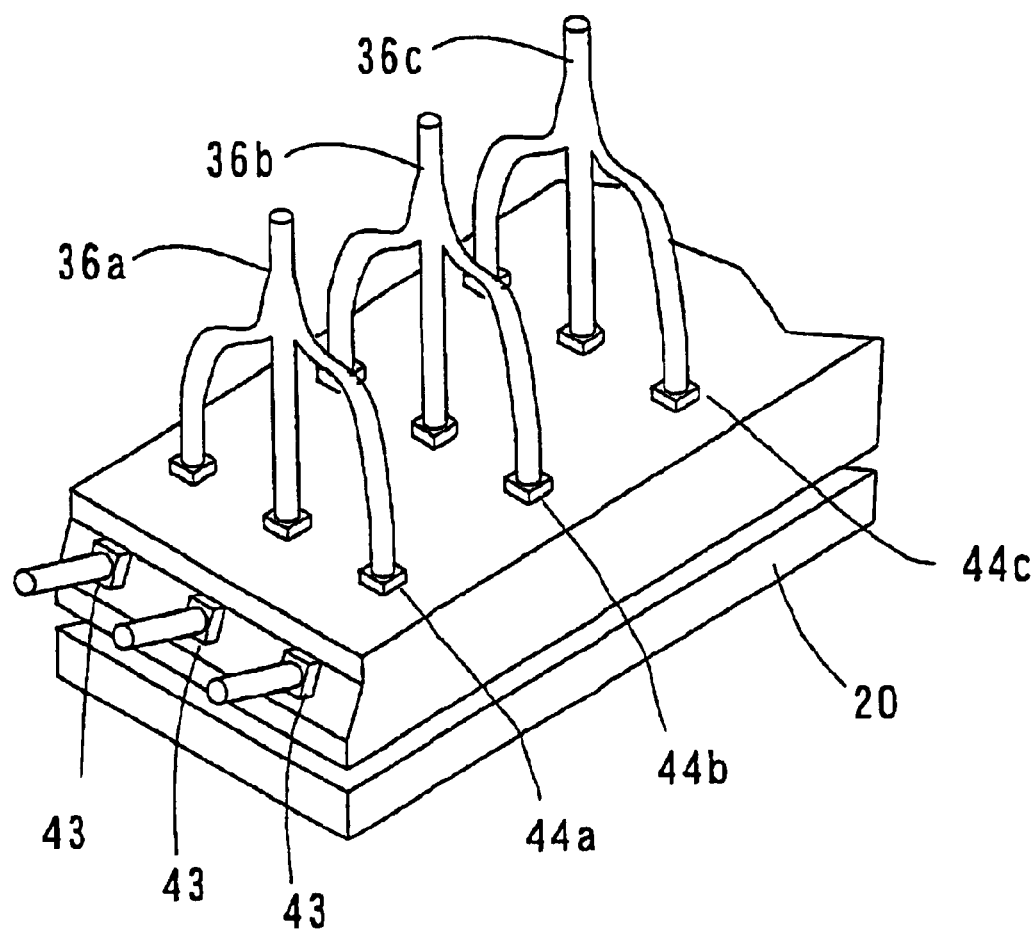
FIG. 18 is an explanatory view schematically showing another embodiment of a multichannel optical switch of the present invention.
Figure 25:
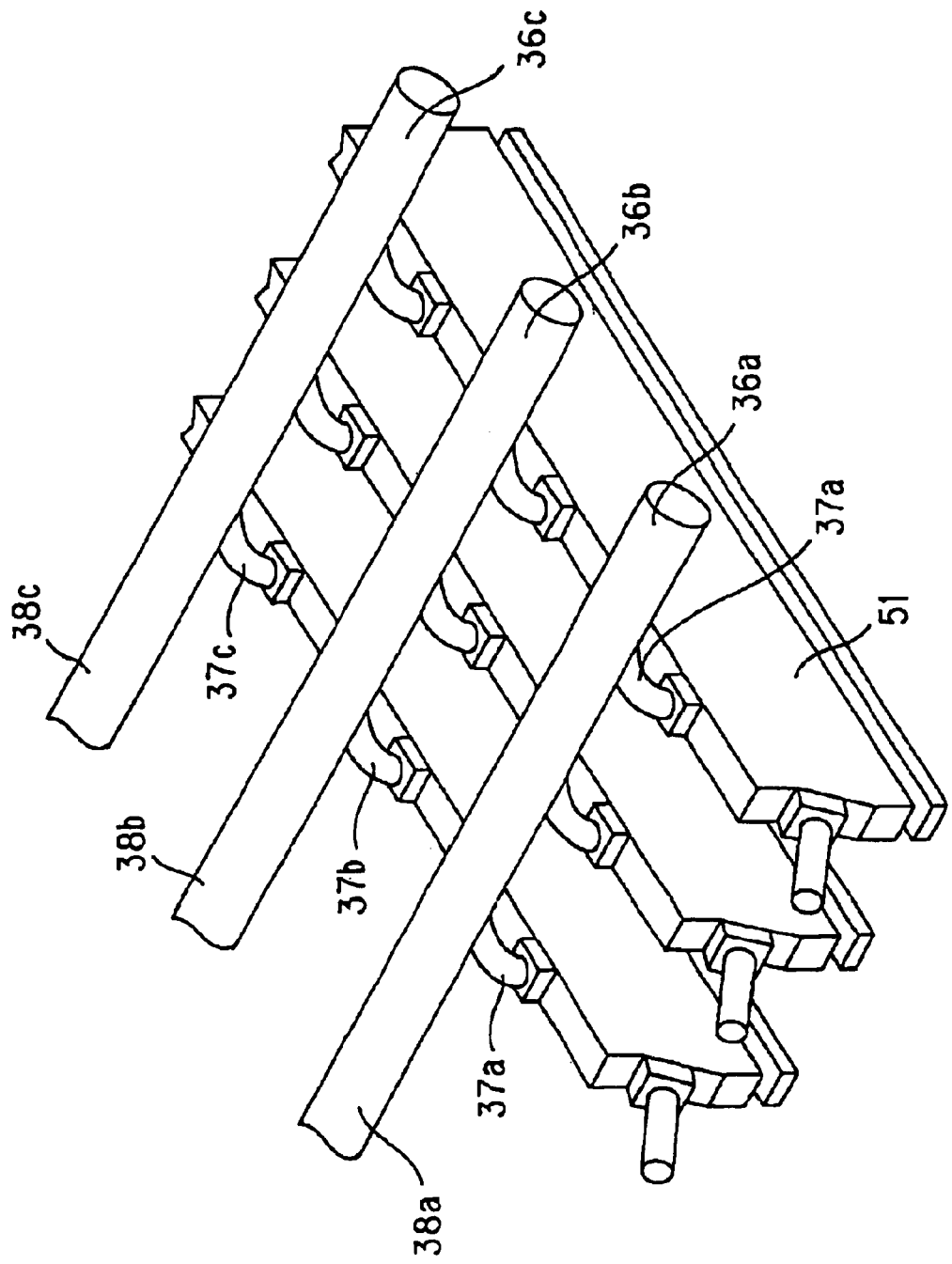
FIG. 25 is an explanatory view schematically showing another embodiment of a multichannel optical switch of the present invention.

Furthermore, another embodiment of the present invention may include, as shown in FIGS. 18, 25, a multichannel optical switch in which optical couplers 36a, 36b, 36c are joined to output ends 44a, 44b, 44c of each light transmission channel in the above-noted multichannel optical switch shown in FIGS. 14 to 16, and at least one part of light transmission channels (not illustrated) is collected. The multichannel optical switch has an advantage in that input and output signals are optionally selected and light is switched to an optional signal channel since output ends 44a, 44b, 44c may be shared.

Figure 26:
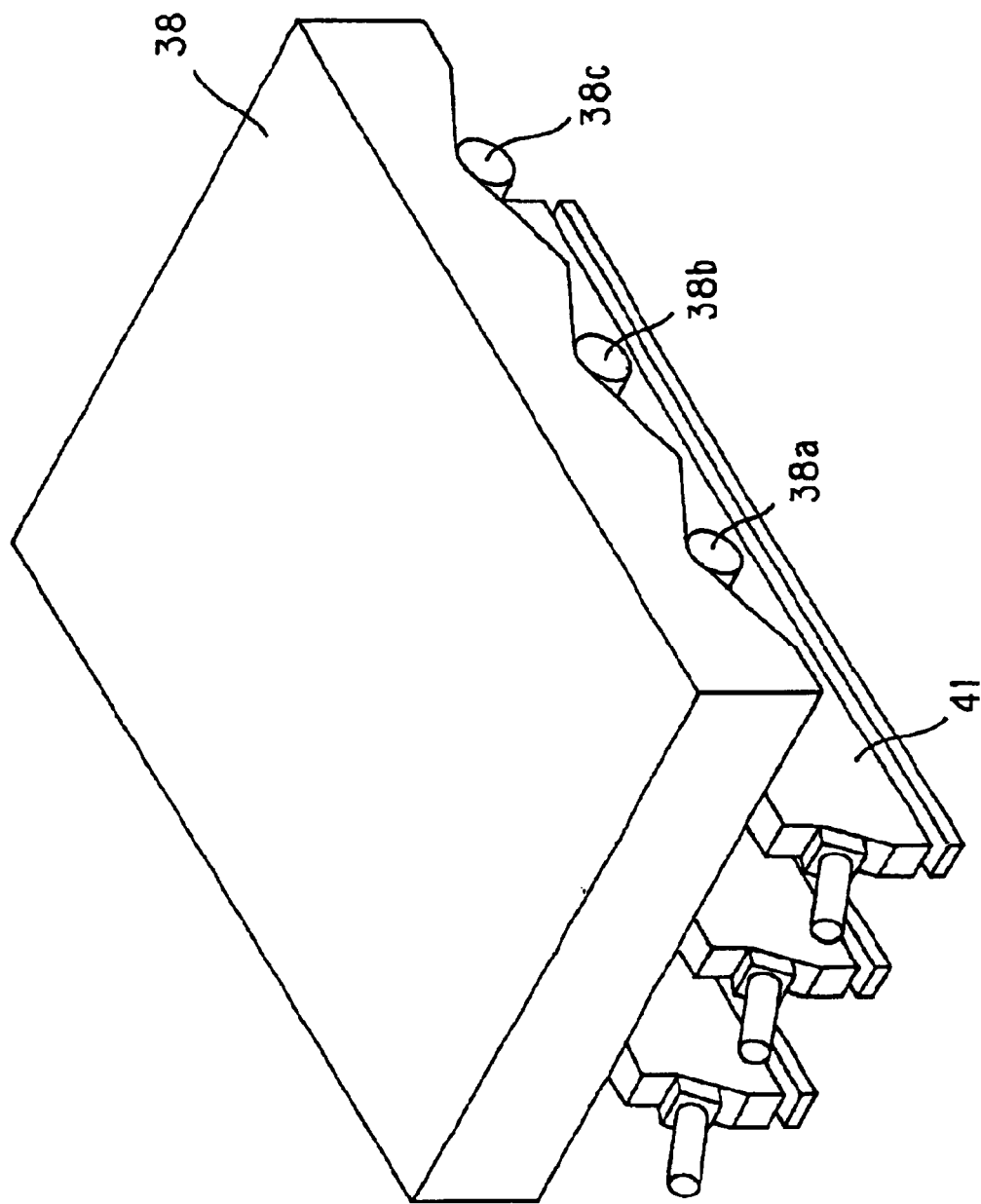
FIG. 26 is an explanatory view schematically showing still another embodiment of a multichannel optical switch of the present invention.

In addition to the structure in which optical couplers 36a, 36b, 36c are joined to output ends 44a, 44b, 44c, or the like, a structure in which the optical couplers are joined to an input end 43 becomes an optical divider wherein an optical switch by which the same light signal branches off and is transmitted to any destination is obtained. As optical couplers 36a–36c or optical dividers, the light transmission channels can be collected at one point as shown in FIG. 18. Another embodiment is where each of light joining channels 37a–37c join the light transmission channels 38a–38c at a plurality of points in an oblique direction. However, as shown in FIG. 26, in the multichannel optical switch shown in FIG. 25, it is preferable to dispose a substrate 39 provided with a groove corresponding to each of the light transmission channels 38a–38c so that the groove may correspond to each of the light transmission channels 38a–38c. Since a plurality of light transmission channels can be disposed with high accuracy at a predetermined pitch by disposing the substrate 39 in such a manner, joining between each multichannel optical switches or between a light source and a multichannel optical switch becomes easy.

Further, in the present invention, a structure in which an optical demultiplexer or an optical multiplexer is connected with the input end 43 or the output end 44 may be employed. By such a structure, an optical switch is created by which a plurality of light signals having various wavelength demultiplexed or multiplexed, and each light signal is transmitted to any channel.

Figure 19:
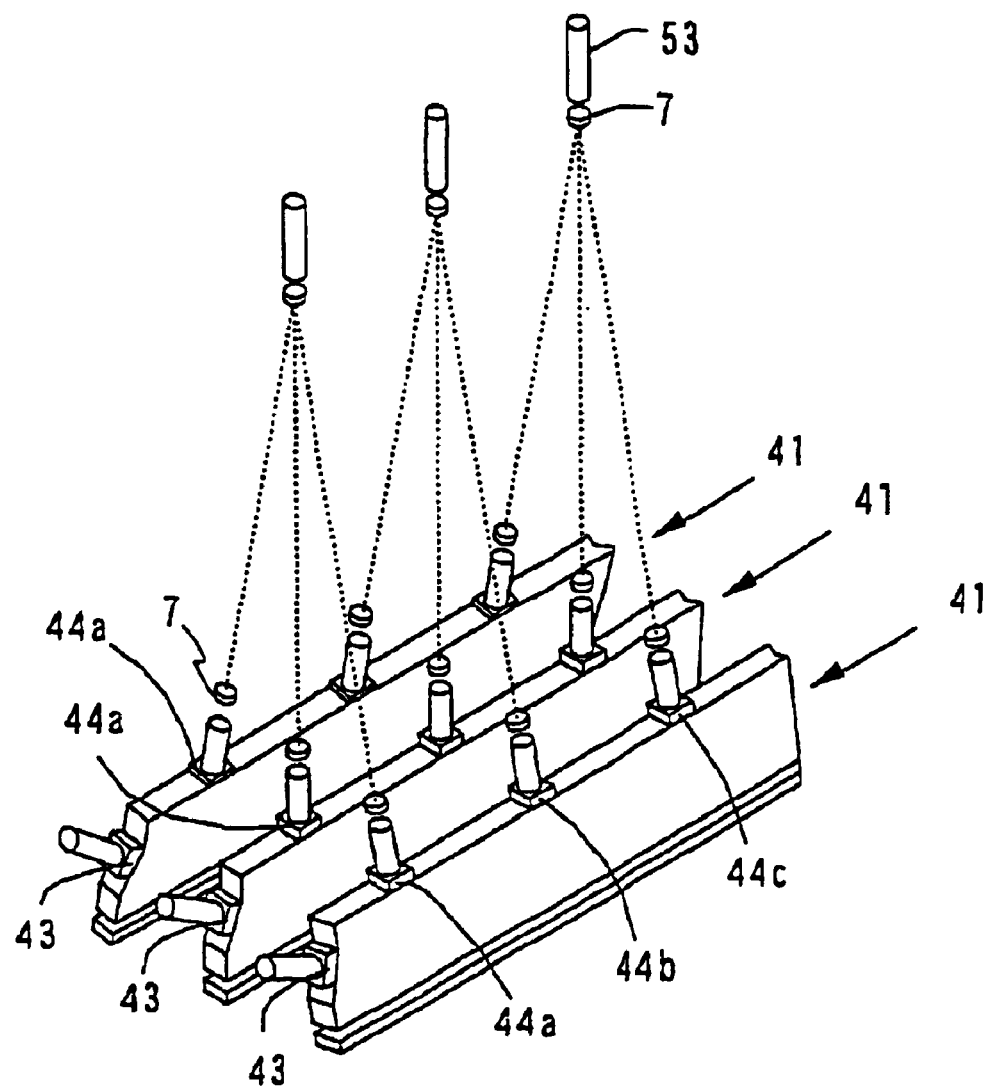
FIG. 19 is an explanatory view schematically showing another embodiment of a multichannel optical switch of the present invention.

Furthermore, another embodiment of the present invention may include, as shown in FIG. 19, a multichannel optical switch having a plurality of multichannel optical switches 41 shown in FIGS. 14–16. In the multichannel optical switch, each multichannel optical switch 41 is arranged so that each output end in each multichannel optical switch, for instance, at least one part of 44a, 44b, 44c is positioned in an arc with an input end of the external light transmission channel 53 disposed independently from the each multichannel optical switch 41 as a center.

This multichannel optical switch also can transmit light output from each output end of a plurality of multichannel optical switches to a common light transmission channel as the multichannel optical switch shown in FIG. 18 described above. This optical switch particularly has such an advantage that no signal loss at jointed parts is generated or minimized since it does not require jointing of light transmission channels by physical means.

In this multichannel optical switch, each multichannel optical switch 41 may be disposed in various positions according to the purpose and use. For example, as shown in FIG. 19, each of output ends 44a, 44b, 44c disposed at the same position among each output end in each multichannel optical switch may be positioned in an arc with an input end of the external light transmission channel 53 in the center. For example, only one output end 44a in each output end may be positioned in an arc with an input end of the external light transmission channel 53 in the center.

In this multichannel optical switch, as shown in FIG. 19, it is preferable to dispose a lens 7 in each of the output ends 44a, 44b, 44c to suppress divergence of light emitted from each of the output ends 44a, 44b, 44c. Further, it is also preferable that the lens 7 is disposed in an input end of the external light transmission channel 53 depending on the external light transmission channel 53 to be employed.

Figure 20:
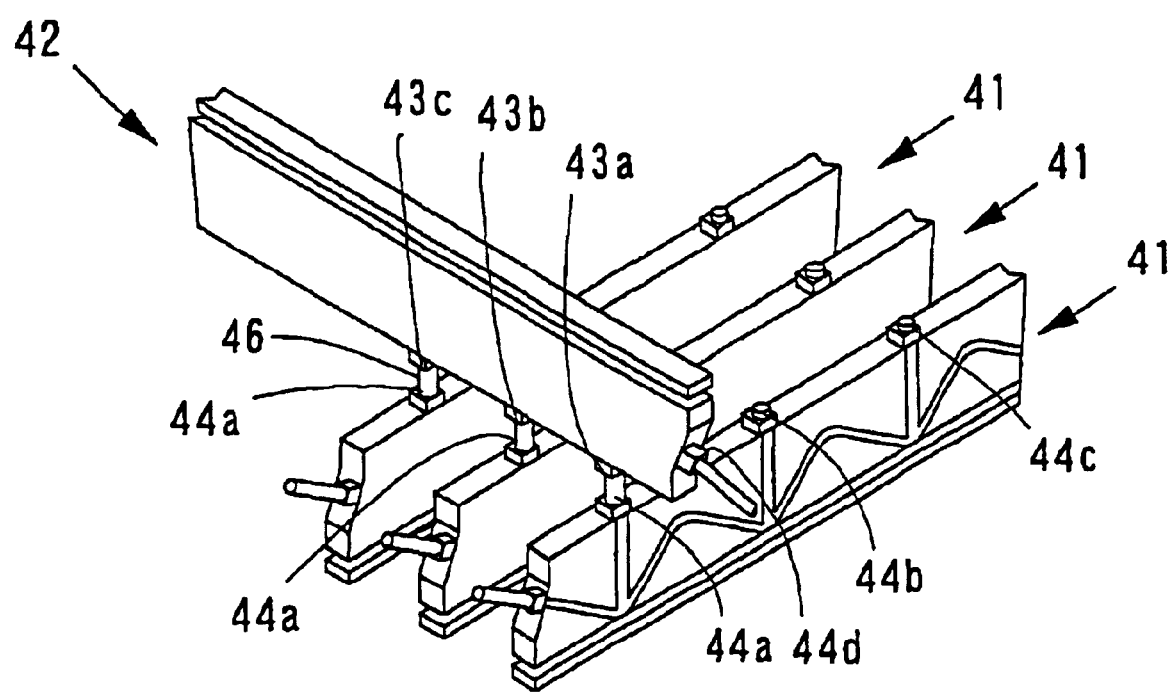
FIG. 20 is an explanatory view schematically showing another embodiment of a multichannel optical switch of the present invention.
Figure 27:
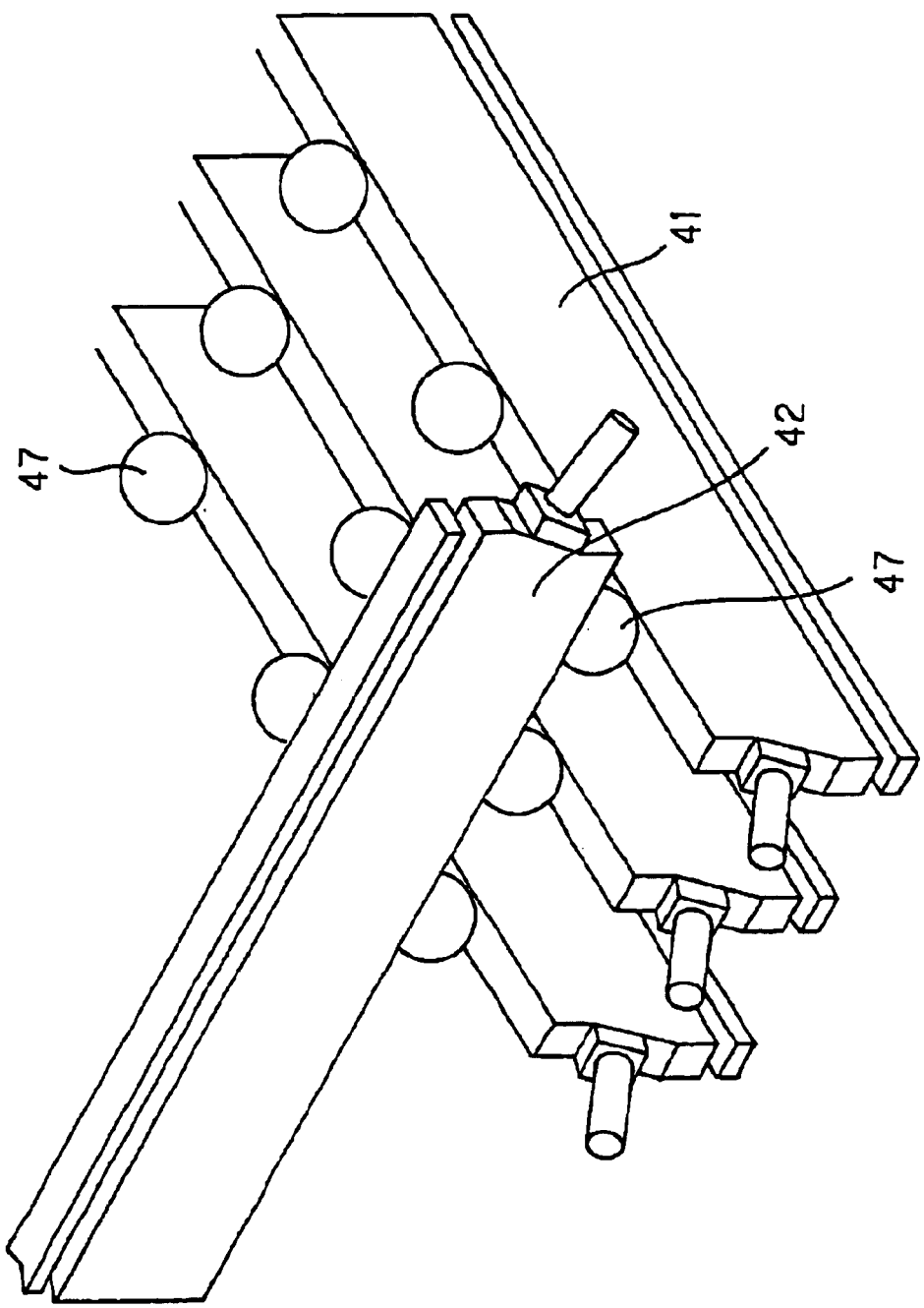
FIG. 27 is an explanatory view schematically showing yet another embodiment of a multichannel optical switch of the present invention.
Figure 28:
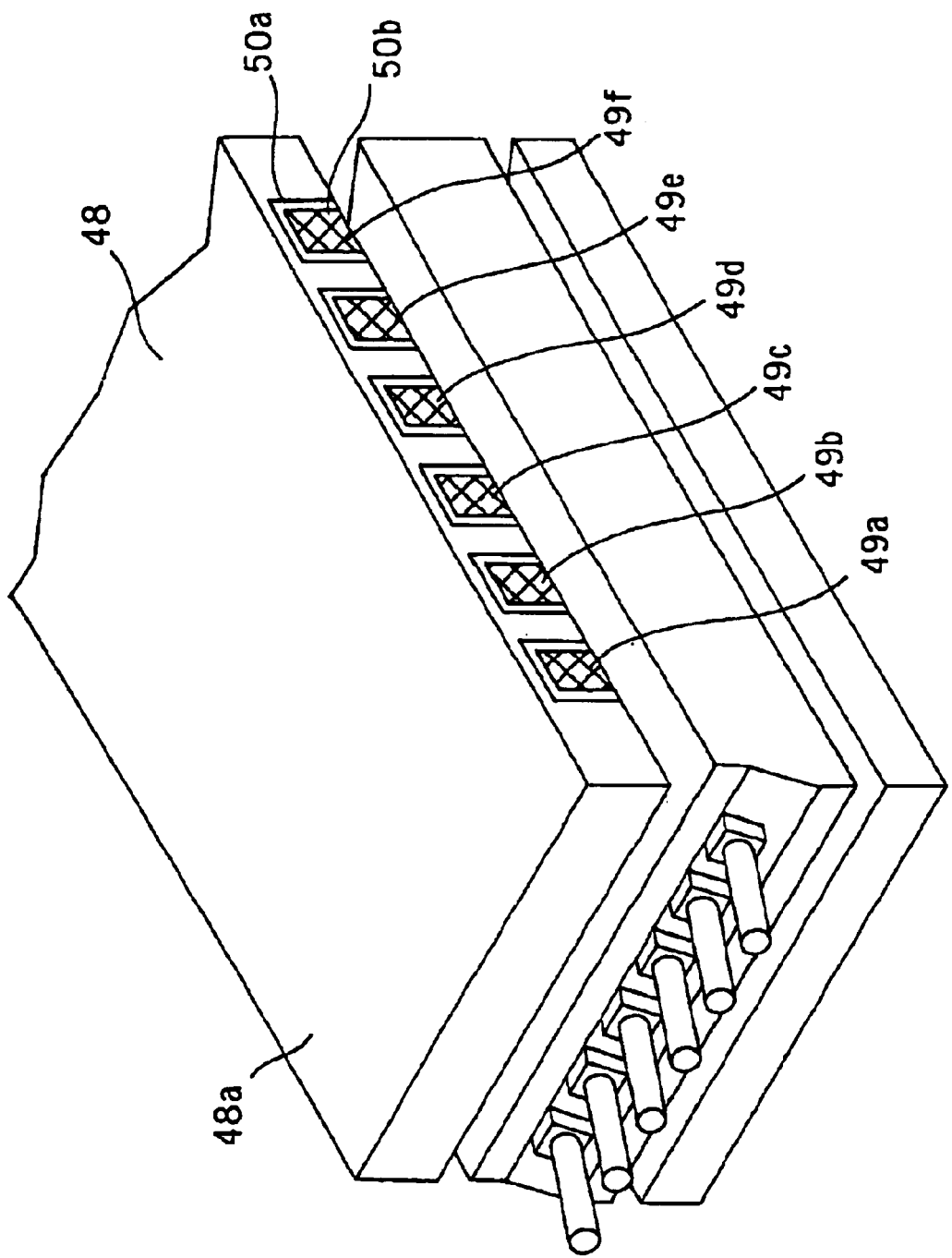
FIG. 28 is an explanatory view schematically showing yet another embodiment of a multichannel optical switch of the present invention.

Furthermore, another embodiment of the present invention may include, as shown in FIG. 20 or 27, a multichannel optical switch in which each output end 44 of a plurality of multichannel optical switches 41 shown in FIGS. 14–16 described above, and a plurality of input ends 43a, 43b, 43c in another identical multichannel optical switch 42 are linked.

Like the multichannel optical switches in FIGS. 18, 19 described above, this multichannel optical switch transmits the light output from each output end of a plurality of various multichannel optical switches. However, since this optical switch constitutes an optical transmission channel by directly connecting each optical-signal input end or optical-signal output end of each multichannel optical switch, the multichannel optical switch has such advantages in that the miniaturization is easy, and so forth.

As a means for directly connecting each optical-signal input end or optical-signal output end of each multichannel optical switch, an optical fiber 46 shown in FIG. 20 or the like is preferable in the point of less light loss. Alternatively, a ball lens 47 may be employed as shown in FIG. 27. However, when the ball lens 47 is used for the connection, it is necessary to adjust both the angle of incidence and the refractive index. In addition, it is preferable to amplify light with arranging a light amplifier or the like because light loss is relatively large in principle.

As still another embodiment of the present invention, there may be employed a multichannel optical switch which has a plurality of multichannel optical switches 41 and an optical waveguide substrate 48 provided with a plurality of optical waveguides 49a–49f in a groove in a substrate body 48a and where each output end (not illustrated) of each multichannel optical switch 41 is communicated with each of the optical waveguides 49a–49f of the optical waveguide substrate 48.

Since an aperture area can be made large by adjusting a depth or a width of the groove in the optical waveguide substrate 48 in this multichannel optical switch, the switch can be easily connected to a signal source (light source) such as a laser or an LED, or to a fiber. However, although the connection becomes easy, light loss is relatively large due to the variations of angle of incidence and outgoing light. Therefore, it is preferable to dispose a light amplifier for use in long-distance communications.

The optical waveguide substrate 48 may be structured so that a substrate 48a provided with grooves having a relatively deep depth arranged at a predetermined pitch is constituted as a clad and that an optical waveguide core 50b is formed with a transparent resin or the like. It is also preferable that a clad layer is formed with a material having a slightly lower refractive index than a material for the optical waveguide core on the surface of the groove and that of the optical waveguide core of transparent resin or the like is provided independently in the groove. Such a structure enables the use of various materials such as resin, metal, glass and ceramics as a material for the substrate and/or the optical waveguide clad. In addition, it is needless to say that a material for the substrate has higher refractive index than a material for the clad in such a structure so that a light loss becomes small in such a structure. In connecting a multichannel optical switch 41 with an optical waveguide substrate 48, they may directly contact each other besides the aforementioned optical fiber, ball lens and the like.

Figure 21:
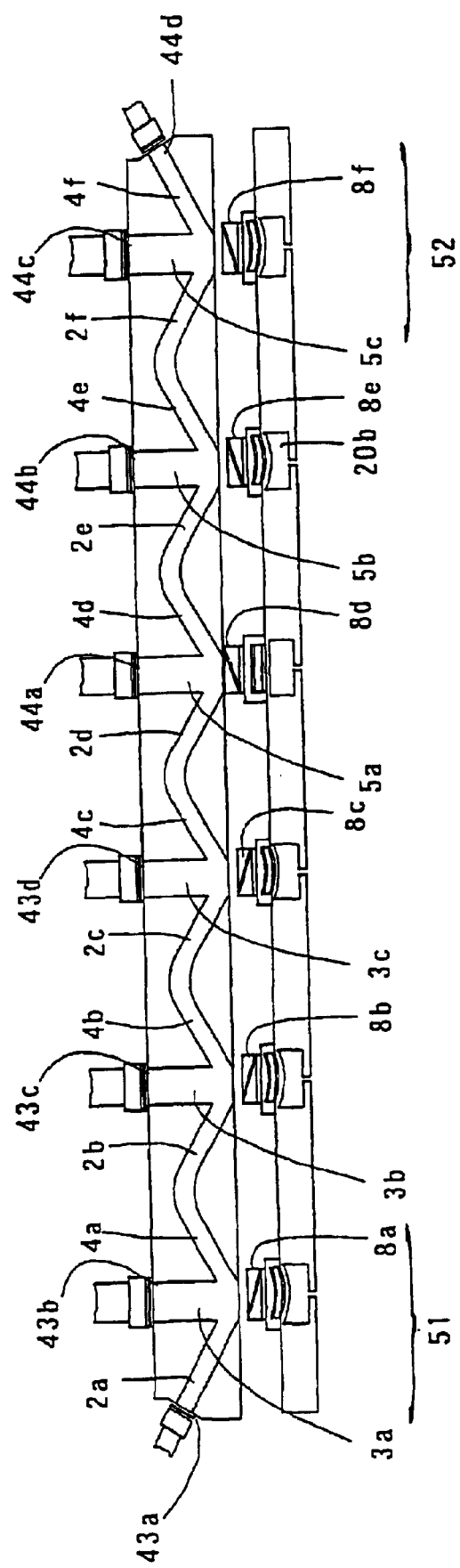
FIG. 21 is an explanatory view schematically showing another embodiment of a multichannel optical switch of the present invention.

Further, as another embodiment of the present invention, there may be employed a multichannel optical switch in which a plurality of optical switches 51 are structured by at least one optical switch 51 having a plurality of input-side channels 2a to 2c and 3a to 3c and at least one optical switch 52 having a plurality of output-side channels 4a to 4c and 5a to 5c as shown in FIG. 21. One output-side light transmission channel 4a to 4c is communicated with one input-side light transmission path 2a to 2e between adjacent optical switches 51, and light input from input end 43a to 43d of a plurality of optical switches 51 is switched in an optical path-changing portion 8a to 8f of a plurality of optical switches 51.

Furthermore, in this multichannel optical switch, each of optical path-changing portions 8a to 8f has a light reflection member having at least two kinds of light reflection angles (In FIG. 21, the light reflection plane 8a to 8c and 8d to 8f among the light path-changing portions 8a to 8f is indicated, and light reflection angles which are mutually line-symmetrical (e.g., relation of 30° and 150°) among the light path-changing portions 8a to 8f. For instance, the light that is input from the input terminal 43a proceeds to a light transmission channel to the optical path-changing portions 8d to 8f when the optical path-changing portions 8a, 8b, 8c are separated from the light transmission portion 1. In the optical path-changing portion 8d in contact with the light transmission portion 1, the optical path is switched to the light transmission channel 5a to the output end 44a, and the light is transmitted from the output end 44a to an external light transmission channel. On the other hand, for instance, in the condition that the optical path-changing portion 8a is brought into contact with the light transmission portion 1, an optical path of the light input from the input end 43b is switched to the light transmission channel 4a toward the optical path-changing portion 8b. The light is similarly transmitted to the light transmission path 5a to 5c toward any of the output ends 44a to 44d corresponding the optical path-changing portions 8d to 8f in any of the optical path-changing portions 8d to 8f which is brought in contact with the light transmission portion 1, and transmitted to the external light transmission channel from any of the output ends 44a to 44d.

Thus, since this multichannel optical switch achieves a M×N type optical switch in which each light input to a plurality of input ends 43a to 43d in one light transmission portion 1 is transmitted to arbitrary one of output ends of 44a to 44d by the operating condition of a plurality of optical path-changing portions, the multichannel optical switch has an advantage in that it is very profitable in trying miniaturization and high integration. However, the multichannel optical switches shown in FIGS. 17 to 19 can input light signals from each input end 43 and process each light signal in parallel. On the other hand, in this multichannel optical switch, a slight time difference is required to input light signals to each light input end 43 (43a to 43d).

Figure 29:
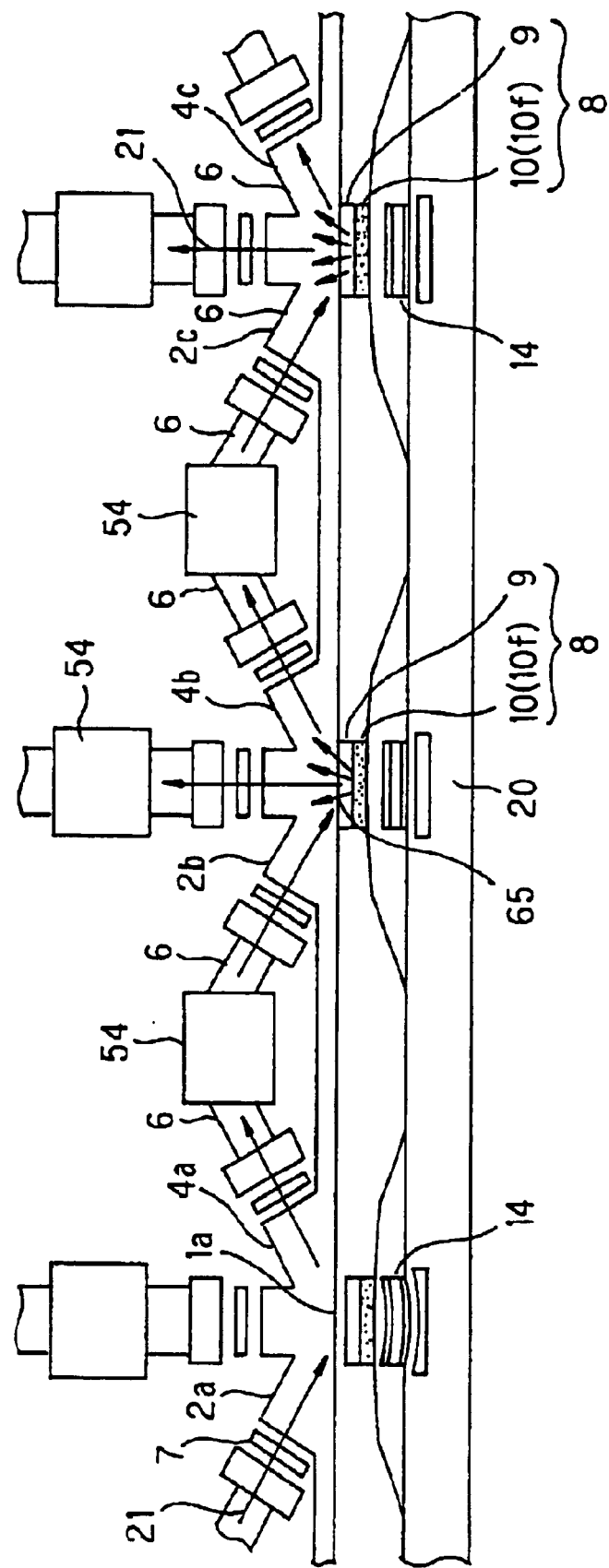
FIG. 29 is an explanatory view schematically showing yet another embodiment of a multichannel optical switch of the present invention.

Yet another embodiment of the present invention is a multichannel optical switch which is constituted by a plurality of optical switches 51 including one or more optical switch(s) 51 having at least an optical path-changing portion 8 provided with a light scattering body 10f, as shown in FIG. 29, and where one output-side light transmission channel 4a, 4b is communicated with one input-side light transmission channel 2b, 2c with an optical fiber 6 with an optical amplifier 54 being interposed therebetween. Light input from the input end in at least one optical switch is divided to numerous light transmission channels at an optical path-changing portion of one or more optical switch(s) to perform switching.

In this multichannel optical switch, light 21 input from a light transmission channel 2a is totally reflected at a light reflecting plane 1a of the light transmission portion 1 and transmitted to a light transmission channel 4a and further to a light transmission channel 2b in an optical switch where an optical path changing portion 8 is under a separated condition. On the other hand, in an optical switch where the optical path changing portion 8 is under a contact condition, light introduced from a light transmission path 2b is taken to an optical path-changing portion, scattered by a light scattering body 10f, and divided to light transmission channels 4b and 5b. Though the divided light is attenuated because of the division at this time, the light is amplified with an optical amplifier when the light is transmitted to a transmission channel ahead, and the attenuated light is complemented; and thereby the optical signal is transmitted with being hardly attenuated even though the light passes a plurality of optical switches. The optical amplifier may be a semiconductor laser diode type, a fiber type, or the like.

Though a multichannel optical switch of the present invention is explained with the intention of optical communication mainly, application for an optical printer is hereinbelow described as an applied embodiment.

Figure 22:
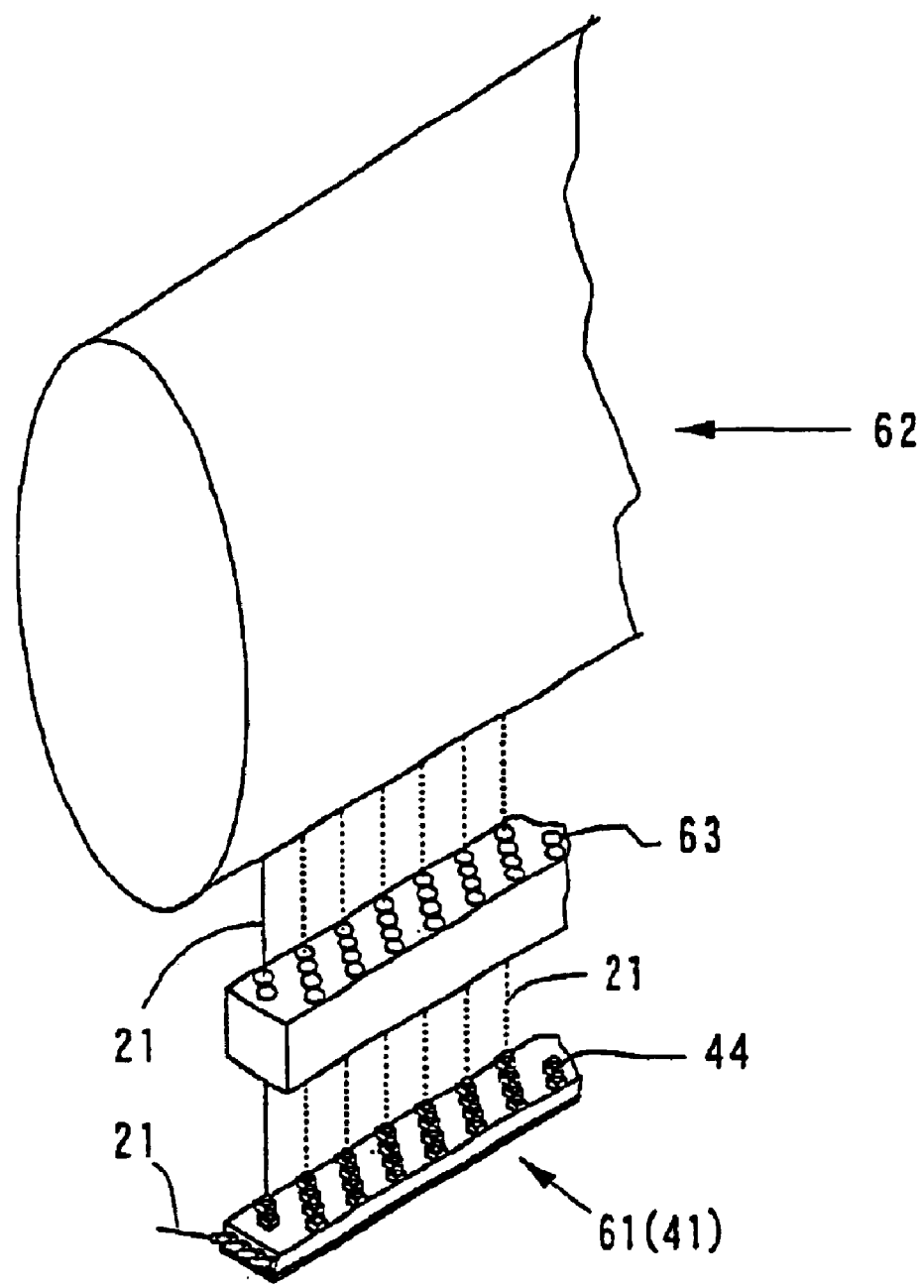
FIG. 22 is an explanatory view schematically showing another embodiment of a multichannel optical switch of the present invention.

FIG. 22 is an explanatory view schematically showing an embodiment where a multichannel optical switch of the present invention is applied to an optical printer.

As shown in FIG. 22, in this optical printer, the aforementioned multichannel optical switch 41 is adapted as a printer head 61. This optical printer is provided, as basic elements, with the printer head 61 consisting of the multichannel optical switch 41, a lens 63 collecting the light 21 output from each output end 44, and a photosensitive dram 62 forming a latent image by the light 21 collected by the lens 63.

In such an optical printer, a structure in which a laser light source is disposed in a shape of an array substantially may be employed. Therefore, optical parts such as a polygon mirror and a lens annexed to the polygon mirror like a conventional laser printer may be omitted and thereby a sharp minimization and decrease in cost by reducing the number of parts can be planned.

In addition, this optical printer is not the one that forms a latent image by light output from each light source disposed at every desired dot like a LED printer, but the one that forms a latent image by light output from each output end being switched and the light from the same light source at every output end disposed in accordance with every dot. Therefore, this optical printer does not have unevenness in quantity of light in each dot and does not cause a problem of decrease in quantity of light due to a temperature rise upon long-time use.

Further, this optical printer is made to be an optical printer having a desired resolution by suitably adjusting intervals for arranging each output end 44 of a multichannel optical switch 41 constituting the printer head 61.

The present invention was explained above in detail based on some embodiments, but the interpretation of the present invention should not be limited to the above-mentioned embodiments. Without departing from the scope of the invention, based on the knowledge of persons skilled in the art, variations, modifications, improvements, and so forth may be added. There may be further provided an optical switch which enables to switch every specific input light and is suitable for an optical communication system.

INDUSTRIAL APPLICABILITY

As described above, according to the present invention, there is provided an optical switch that solves conventional problems of optical switches, consumes little power and, at the same time, allows high-speed response, size reduction, high integration, and reduction of signal attenuation, and further an optical switch suitable for an optical communication system, an optical storage device, an optical arithmetic unit, an optical recorder, an optical printer and so forth, and capable of switching for each specific beam.

What is claimed is:

1. An optical switch comprising at least a light transmission portion, an optical path-changing portion and an actuator portion; wherein
    the light transmission portion has a light reflecting plane provided on at least one part of a plane facing the optical path-changing portion to totally reflect light, and light transmission channels having optical wave guiding bodies and being provided in at least three directions with the light reflecting plane as a starting point;
    the optical path-changing portion is provided in proximity to the light reflecting plane of the light transmission portion in a movable condition and has an optical path-changing member for at least diffusely reflecting or scattering light; and
    the actuator portion has a mechanism that is displaced by external signals and transmits the displacement to the optical path-changing portion; characterized in that
    the switching or dividing of an optical path is carried out by contacting or separating the optical path-changing portion to or from the light reflecting plane of the light transmission portion by displacement of the actuator portion in response to the external signals;
    so as to totally reflect an input light from the light transmission channels at the light reflecting plane of the light transmission portion and transmit it to a specific light transmission channel on an output side when the optical path-changing portion is separated from the light reflecting plane of the light transmission portion;
    or take out an input light from the light transmission channel, diffusely reflect or scatter it at the optical path-changing portion, and transmit it to a specific one or more light transmission channels on the output side when the optical path-changing portion is contacted to the light reflecting plane of the light transmission portion.

2. An optical switch comprising at least a light transmission portion, an optical path-changing portion and an actuator portion; wherein
    the light transmission portion has a light reflecting plane provided on at least one part of a plane facing the optical path-changing portion to totally reflect light, and light transmission channels having optical wave guiding bodies and being provided in at least three directions with the light reflecting plane as a starting point;
    the optical path-changing portion is provided in proximity to the light reflecting plane of the light transmission portion in a movable condition and has an optical path-changing member for at least reflecting or scattering light; and
    the actuator portion has a mechanism that is displaced by external signals and transmits the displacement to the optical path-changing portion, the actuator portion comprising:
    a piezoelectric/electrostrictive element comprising a piezoelectric/electrostrictive layer and at least one pair of electrodes arranged on one part of the piezoelectric/electrostrictive layer;
    a vibrating member that is in contact with at least one part of the piezoelectric/electrostrictive element to support the piezoelectric/electrostrictive element and that converts strain of the piezoelectric/electrostrictive layer into bending displacement or vibrations;
    a fixing member to fix at least one part of the vibrating member so as to vibrate the vibrating member; and
    a displacement transmission member that is arranged between the optical path-changing portion and the piezoelectric/electrostrictive element, and transmits displacement of the piezoelectric/electrostrictive element to the optical path-changing portion; wherein
    the switching or dividing of an optical path is carried out by contacting or separating the optical path-changing portion to or from the light reflecting plane of the light transmission portion by displacement of the actuator portion in response to the external signals;
    so as to totally reflect an input light from the light transmission channels at the light reflecting plane of the light transmission portion and transmit it to a specific light transmission channel on an output side when the optical path-changing portion is separated from the light reflecting plane of the light transmission portion;
    or take out an input light from the light transmission channel, reflect or scatter it at the optical path-changing portion, and transmit it to a specific one or more light transmission channels on the output side when the optical path-changing portion is contacted to the light reflecting plane of the light transmission portion.

3. The optical switch according to claim 2, wherein a ceramic substrate is constituted by unitarily firing the vibrating member and the fixing member, and a recessed portion or a hollow portion is formed in the ceramic substrate with giving the vibrating member a thin structure.

4. The optical switch according to claim 2, wherein the piezoelectric/electrostrictive element comprises a laminated body in which an anode layer having linking multiple layers functioning as anodes and a cathode layer having linking multiple layers functioning as cathodes are alternately laminated with a ceramic piezoelectric/electrostrictive layer being positioned therebetween.

5. The optical switch according to claim 2, wherein the light transmission portion comprises two or more layers having different light refractive indexes.

6. The optical switch according to claim 2, wherein the light transmission channels of the light transmission portion comprise optical waveguides.

7. The optical switch according to claim 2, wherein the light transmission portion is configured by joining at least two optical wave guiding bodies to one optical wave guiding body so as to form light transmission channels into at least three directions, with the light reflecting plane of the light transmission portion as a starting point.

8. The optical switch according to claim 2, further comprising a condenser lens or a collimator lens arranged at each of a plurality of light-signal input ends and/or light-signal output ends of the light transmission portion, and light signals are input and output through the condenser lens or the collimator lens.

9. The optical switch according to claim 2, wherein the optical path-changing portion has a light introduction member made of a transparent material.

10. The optical switch according to claim 2, wherein the optical path-changing portion has a light reflector for specularly reflecting light.

11. The optical switch according to claim 10, wherein the light reflector for specularly reflecting light is a light reflecting film that is integrally formed on a plane of the light introduction member on the side of the displacement transmission member.

12. The optical switch according to claim 2, wherein the optical path-changing portion has a light reflector for diffusely reflecting light or a light scattering body for scattering light.

13. The optical switch according to claim 2, wherein the optical path-changing portion is constituted only by a light reflector for diffusely reflecting light or a light scattering body for scattering light.

14. A multichannel optical switch provided with a plurality of optical switches each comprising at least a light transmission portion, an optical path-changing portion and an actuator portion; characterized in that the light transmission portion has a light reflecting plane provided on at least one part of a plane facing the optical path-changing portion to totally reflect light, and light transmission channels having optical wave guiding bodies and being provided in at least three directions with the light reflecting plane as a starting point;

the optical path-changing portion is provided in proximity to the light reflecting plane of the light transmission portion in a movable condition and has an optical path-changing member for at least reflecting or scattering light; and the actuator portion has a mechanism that is displaced by external signals and transmits the displacement to the optical path-changing portion; wherein the actuator portion further comprises:

a piezoelectric/electrostrictive element having a piezoelectric/electrostrictive layer and at least one pair of electrodes arranged on one part of the piezoelectric/electrostrictive layer;

a vibrating member that is in contact with at least one part of the piezoelectric/electrostrictive element to support the piezoelectric/electrostrictive element and that converts strain of the piezoelectric/electrostrictive layer into bending displacement or vibrations;

a fixing member to fix at least one part of the vibrating member so as to vibrate the vibrating member; and a displacement transmission member that is arranged between the optical path-changing portion and the piezoelectric/electrostrictive element and transmits displacement of the piezoelectric/electrostrictive element to the optical path-changing portion; wherein the switching or dividing of an optical path is carried out by contacting or separating the optical path-changing portion to or from the light reflecting plane of the light transmission portion by displacement of the actuator portion in response to the external signals;

so as to totally reflect an input light from the light transmission channels at the light reflecting plane of the light transmission portion and transmit it to a specific light transmission channel on an output side when the optical path-changing portion is separated from the light reflecting plane of the light transmission portion;

or take out an input light from the light transmission channel, reflect or scatter it at the optical path-changing portion, and transmit it to a specific one or more light transmission channels on the output side when the optical path-changing portion is contacted to the light reflecting plane of the light transmission portion.

15. The multichannel optical switch according to claim 14, wherein each light transmission channel in a plurality of optical switches is formed of a single light transmission portion.

16. The multichannel optical switch according to claim 15, wherein each light transmission channel in a plurality of optical switches is crossed to each other and shares a part of each light transmission channel.

17. The multichannel optical switch according to claim 14, wherein one input-side channel is linked to one output-side channel in series as for each optical switch; and light that is input from an input end of optical switches, is switched at each optical path-changing portion of a plurality of optical switches.

18. The multichannel optical switch according to claim 14, wherein a plurality of optical switches are constituted by at least one optical switch having a plurality of input-side channels and at least one optical switch having a plurality of output-side channels, and one input-side channel is linked to one output-side channel between adjacent optical switches, switching the light input from input ends of a plurality of optical switches at the optical path-changing portion of the plurality of optical switches.

19. A multichannel optical switch according to claim 14, wherein a plurality of optical switches link one input-side channel to one output-side channel between adjacent optical switches by means of an optical fiber, switching at least the light input from input ends in an optical switch at each optical path-changing portion of a plurality of optical switches.

20. A multichannel optical switch comprising a plurality of the multichannel switches according to claim 17 arranged in a row.

21. A multichannel optical switch comprising a plurality of the multichannel switches according to claim 18 arranged in a row.

22. A multichannel optical switch comprising a plurality of the multichannel switches according to claim 19 arranged in a row.

23. A multichannel optical switch comprising a plurality of the multichannel optical switches according to claim 17; wherein each multichannel optical switch is arranged by locating at least one part of output ends themselves of each light transmission channel in each multichannel optical switch in an arc condition with an input end in an outer light transmission channel, which is disposed separately from each multichannel optical switch, at a center.

24. A multichannel optical switch comprising a plurality of the multichannel optical switches according to claim 18; wherein each multichannel optical switch is arranged by locating at least one part of output ends themselves of each light transmission channel in each multichannel optical switch in an arc condition with an input end in an outer light transmission channel, which is disposed separately from each multichannel optical switch, at a center.

25. A multichannel optical switch comprising a plurality of the multichannel optical switches according to claim 19; wherein each multichannel optical switch is arranged by locating at least one part of output ends themselves of each light transmission channel in each multichannel optical switch in an arc condition with an input end in an outer light transmission channel, which is disposed separately from each multichannel optical switch, at a center.

26. A multichannel optical switch in which an optical divider or an optical coupler is joined to a light-signal input end or a light-signal output end of each light transmission channel in the multichannel optical switches according to claim 20 to branch or collect at least one part of the light transmission channel.

27. A multichannel optical switch in which an optical divider or an optical coupler is joined to a light-signal input end or a light-signal output end of each light transmission channel in the multichannel optical switches according to claim 21 to branch or collect at least one part of the light transmission channel.

28. A multichannel optical switch in which an optical divider or an optical coupler is joined to a light-signal input end or a light-signal output end of each light transmission channel in the multichannel optical switches according to claim 22 to branch or collect at least one part of the light transmission channel.

29. A multichannel optical switch in which an optical demultiplexer filter or an optical multiplexer is joined to a light-signal input end or a light-signal output end of each light transmission channel in the multichannel optical switches according to claim 20 to branch or collect at least one part of the light transmission channel.

30. A multichannel optical switch in which an optical demultiplexer filter or an optical multiplexer is joined to a light-signal input end or a light-signal output end of each light transmission channel in the multichannel optical switches according to claim 21 to branch or collect at least one part of the light transmission channel.

31. A multichannel optical switch in which an optical demultiplexer filter or an optical multiplexer is joined to a light-signal input end or a light-signal output end of each, light transmission channel in the multichannel optical switches according to claim 22 to branch or collect at least one part of the light transmission channel.

32. A multichannel optical switch in which each output end or each input end of a plurality of the multichannel optical switches according to claim 17 is linked to a plurality of input ends or output ends in at least another multichannel optical switch.

33. A multichannel optical switch in which each output end or each input end of a plurality of the multichannel optical switches according to claim 18 is linked to a plurality of input ends or output ends in at least another multichannel optical switch.

34. A multichannel optical switch in which each output end or each input end of a plurality of the multichannel optical switches according to claim 19 is linked to a plurality of input ends or output ends in at least another multichannel optical switch.

35. The multichannel optical switch according to claim 14, wherein a substrate of ceramics is constituted by unitarily sintering the vibrating member and the fixing member, and that a recessed portion or a hollow portion is formed in the substrate with giving the vibrating member a thin structure.

36. The multichannel optical switch according to claim 14, wherein the piezoelectric/electrostrictive element comprises a laminated body in which an anode layer of linking multiple layers as anodes and a cathode layer of linking multiple layers as cathodes are alternately laminated with a ceramic piezoelectric/electrostrictive layer being positioned therebetween.

37. The multichannel optical switch according to claim 14, wherein the light transmission portion is configured by joining at least two optical wave guiding bodies to one optical wave guiding body so as to form light transmission channels into at least three directions, with the light reflecting plane of the light transmission portion as a starting point.

38. The multichannel optical switch according to claim 14, further comprising a condenser lens or a collimator lens arranged at each of a plurality of input ends and/or output ends of the light transmission portion, and light signals are input and output through the condenser lens or the collimator lens.

39. The multichannel optical switch according to claim 14, wherein the light transmission portion comprises two or more layers having different light refractive indexes.

40. The multichannel optical switch according to claim 14, wherein a light transmission channel comprising an optical wave guiding body is formed at one part of the light transmission portions.

41. The multichannel optical switch according to claim 14, wherein the optical path-changing portion has a light introduction member made of a transparent material.

42. The multichannel optical switch according to claim 14, wherein the optical path-changing portion has a light reflector for specularly reflecting light.

43. The multichannel optical switch according to claim 42, wherein the light reflector for specularly reflecting light is a light reflecting film that is integrally formed on a plane of the light introduction member on the side of the displacement transmission member.

44. The multichannel optical switch according to claim 14, wherein each optical path-changing portion has a light reflector, and at least two kinds of specular reflection angles are shared among the optical path-changing portions.

45. A multichannel optical switch provided with a plurality of optical switches each of which comprising at least a light transmission portion, an optical path-changing portion and an actuator portion; characterized in that the light transmission portion has a light reflecting plane provided on at least one part of a plane facing the optical path-changing portion to totally reflect light, and light transmission channels having optical wave guiding bodies and being provided in at least three directions with the light reflecting plane as a starting point;

the optical path-changing portion is provided in proximity to the light reflecting plane of the light transmission portion in a movable condition and has an optical path-changing member for at least diffusely reflecting or scattering light; and the actuator portion has a mechanism that is displaced by external signals and transmits the displacement to the optical path-changing portion; wherein the switching or dividing of an optical path is carried out by contacting or separating the optical path-changing portion to or from the light reflecting plane of the light transmission portion by displacement of the actuator portion in response to the external signals;

so as to totally reflect an input light from the light transmission channels at the light reflecting plane of the light transmission portion and transmit it to a specific light transmission channel on an output side when the optical path-changing portion is separated from the light reflecting plane of the light transmission portion;

or take out an input light from the light transmission channel, diffusely reflect or scatter it at the optical path-changing portion, and transmit it to a specific one or more light transmission channels on the output side when the optical path-changing portion is contacted to the light reflecting plane of the light transmission portion.

46. The multichannel optical switch according to claim 45, wherein the optical path-changing portion is constituted only by a light reflector for diffusely reflecting light or a light scattering body for scattering light.

* * * * *